US006824064B2

(12) United States Patent
Guthery et al.

(10) Patent No.: US 6,824,064 B2
(45) Date of Patent: Nov. 30, 2004

(54) CONCURRENT COMMUNICATION WITH MULTIPLE APPLICATIONS ON A SMART CARD

(75) Inventors: Scott Bates Guthery, Newton, MA (US); Mary Joanne Kiernan Cronin, Newton, MA (US)

(73) Assignee: Mobile-Mind, Inc., Watertown, MA (US)

( * ) Notice: Subject to any disclaimer, the term of this patent is extended or adjusted under 35 U.S.C. 154(b) by 286 days.

(21) Appl. No.: 09/730,670

(22) Filed: Dec. 6, 2000

(65) Prior Publication Data

US 2002/0066792 A1 Jun. 6, 2002

(51) Int. Cl.$^7$ .............................................. G06K 19/06
(52) U.S. Cl. ...................... 235/492; 235/375; 235/380; 235/382; 361/737; 711/102; 711/103; 710/102; 710/301
(58) Field of Search ................................. 235/492, 380, 235/382, 486, 379; 361/737; 711/102, 103; 710/102, 301

(56) References Cited

U.S. PATENT DOCUMENTS

| 3,412,382 A | 11/1968 | Couleur et al. |
| 3,825,904 A | 7/1974 | Burk et al. |
| 4,442,484 A | 4/1984 | Childs, Jr. et al. .......... 364/200 |

(List continued on next page.)

FOREIGN PATENT DOCUMENTS

| EP | 1 179 780 A1 | 2/2002 |
| EP | 1 331 565 A1 | 7/2002 |
| EP | 1 331 565 A1 | 7/2003 |
| WO | WO 97/50063 | 12/1997 |
| WO | WO 01/16707 A1 | 1/2000 |
| WO | WO 01/16759 A1 | 1/2000 |
| WO | WO 01/16865 A1 | 1/2000 |
| WO | WO 01/16873 A1 | 1/2000 |
| WO | WO 01/16874 A1 | 1/2000 |

(List continued on next page.)

OTHER PUBLICATIONS

"Part III —Application Section," *EMV '96 Integrated Circuit Card Specification for Payment Systems*, Version 3.1.1, May 31, 1998.
International Standard, "Information technology —Identification cards —Integrated circuit(s) with contacts —Part 4: Interindustry commands for interchange," *ISO/IEC 7816–4*, (1995).
Global System for Mobile Communications, "Digital cellular telecommunications system (Phase 2+); Specification of the SIM Application Toolkit for the Subscriber Identity Module —Mobile Equipment (SIM —ME) interface," *GSM 11.14 version 8.2.0*, Release 1999.

(List continued on next page.)

*Primary Examiner*—Michael G. Lee
*Assistant Examiner*—Ahshik Kim
(74) *Attorney, Agent, or Firm*—Gesmer Updegrove LLP

(57) ABSTRACT

A smart card capable of having a plurality of applications has a memory that is logically partitioned into a plurality of memory blocks. A control program allocates one or more blocks to one of the applications, upon a declaration from the application of its memory needs, and schedules the applications for execution. Only those applications whose memory needs have been satisfied are scheduled. The control program receives a permission request packet from a host, addressed to an application, and passes the permission request packet to the application. When the control program receives a permission packet from the addressed application after the addressed application has had its declared memory needs satisfied, the control program sends the permission packet to the host. A virtual machine is used to execute one or more of the applications. The control program communicates with the virtual machine to control scheduling to predetermined time granularity. A swapper swaps data pages between the smart card's memory, i.e., primary storage, and secondary storage in a host.

7 Claims, 33 Drawing Sheets

U.S. PATENT DOCUMENTS

| | | | |
|---|---|---|---|
| 4,685,125 A | 8/1987 | Zave | |
| 4,718,061 A | 1/1988 | Turner | 370/89 |
| 4,774,659 A | 9/1988 | Smith et al. | 364/200 |
| 4,868,376 A | 9/1989 | Lessin et al. | |
| 4,972,338 A | 11/1990 | Crawford et al. | 364/200 |
| 5,204,965 A | 4/1993 | Guthery et al. | 395/800 |
| 5,613,073 A | 3/1997 | Hammond, Jr. et al. | 395/250 |
| 5,729,717 A * | 3/1998 | Tamada et al. | 395/491 |
| 5,860,083 A * | 1/1999 | Sukegawa | 711/103 |
| 5,912,453 A * | 6/1999 | Gungl et al. | 235/492 |
| 5,923,884 A | 7/1999 | Peyret et al. | 395/712 |
| 5,969,318 A | 10/1999 | Mackenthun | 235/380 |
| 6,003,134 A | 12/1999 | Kuo et al. | |
| 6,005,942 A | 12/1999 | Chan et al. | 380/25 |
| 6,029,892 A * | 2/2000 | Miyake | 235/380 |
| 6,032,137 A * | 2/2000 | Ballard | 705/75 |
| 6,038,551 A | 3/2000 | Barlow et al. | 705/41 |
| 6,052,690 A | 4/2000 | de Jong | 707/101 |
| 6,081,665 A | 6/2000 | Nilsen et al. | |
| 6,095,412 A * | 8/2000 | Bertina et al. | 235/380 |
| 6,145,080 A * | 11/2000 | Hanel | 713/200 |
| 6,186,677 B1 | 2/2001 | Angel et al. | |
| 6,216,204 B1 * | 4/2001 | Thiriet | 711/115 |
| 6,220,510 B1 * | 4/2001 | Everett et al. | 235/380 |
| 6,250,557 B1 * | 6/2001 | Forslund et al. | 235/492 |
| 6,256,690 B1 * | 7/2001 | Carper | 710/102 |
| 6,273,335 B1 * | 8/2001 | Sloan | 235/382 |
| 6,296,191 B1 * | 10/2001 | Hamann et al. | 235/492 |
| 6,317,832 B1 * | 11/2001 | Everett et al. | 713/372 |
| 6,374,286 B1 | 4/2002 | Gee et al. | |
| 6,390,374 B1 | 5/2002 | Carper et al. | 235/492 |
| 6,415,160 B1 | 7/2002 | Wichmann | 455/558 |
| 6,438,573 B1 | 8/2002 | Nilsen | |
| 6,480,935 B1 * | 11/2002 | Carper et al. | 711/115 |
| 6,510,498 B1 | 1/2003 | Holzle et al. | |
| 6,526,462 B1 | 2/2003 | Elabd | |
| 6,564,995 B1 * | 5/2003 | Montgomery | 235/379 |
| 2002/0095661 A1 | 7/2002 | Angel et al. | |
| 2002/0099871 A1 | 7/2002 | Vargas et al. | 709/328 |
| 2003/0037089 A1 | 2/2003 | Cota-Robles et al. | |
| 2003/0041244 A1 | 2/2003 | Buttyan et al. | |
| 2003/0046365 A1 | 3/2003 | Pfister et al. | |
| 2003/0065676 A1 | 4/2003 | Gbadegesin et al. | |

FOREIGN PATENT DOCUMENTS

| | | |
|---|---|---|
| WO | WO 00/07153 | 2/2000 |
| WO | WO 00/46709 | 8/2000 |
| WO | WO 00/56030 | 9/2000 |
| WO | WO 02/08897 A1 | 1/2002 |
| WO | WO 02/10889 A2 | 2/2002 |
| WO | WO 02/10918 A1 | 2/2002 |
| WO | WO 02/25976 A1 | 3/2002 |
| WO | WO 02/056174 A2 | 7/2002 |
| WO | WO 03/007105 A2 | 1/2003 |
| WO | WO 03/017125 A1 | 2/2003 |

OTHER PUBLICATIONS

Guthery, S., Self–Timing Programs and the Quantum Scheduler, Communications of the ACM, Jun. 1988.

Guthery, Scott B.; "Planned Preemption Scheduling of Light–Weight Processes in a Time–Shared Environment." Abstracts Of The IEEE Computer Society —Third Workshop On Real–Time Operating Systems, Boston, Massachusetts; IEEE Computer Society, Feb. 28, 1986.

Hypponen, Konstantin et al.; "Trading–Off Type–Inference Memory Complexity Against Communication." The Fifth International Conference on Information and Communication Security, Huhhot, Mongolia, Oct. 2003.

* cited by examiner

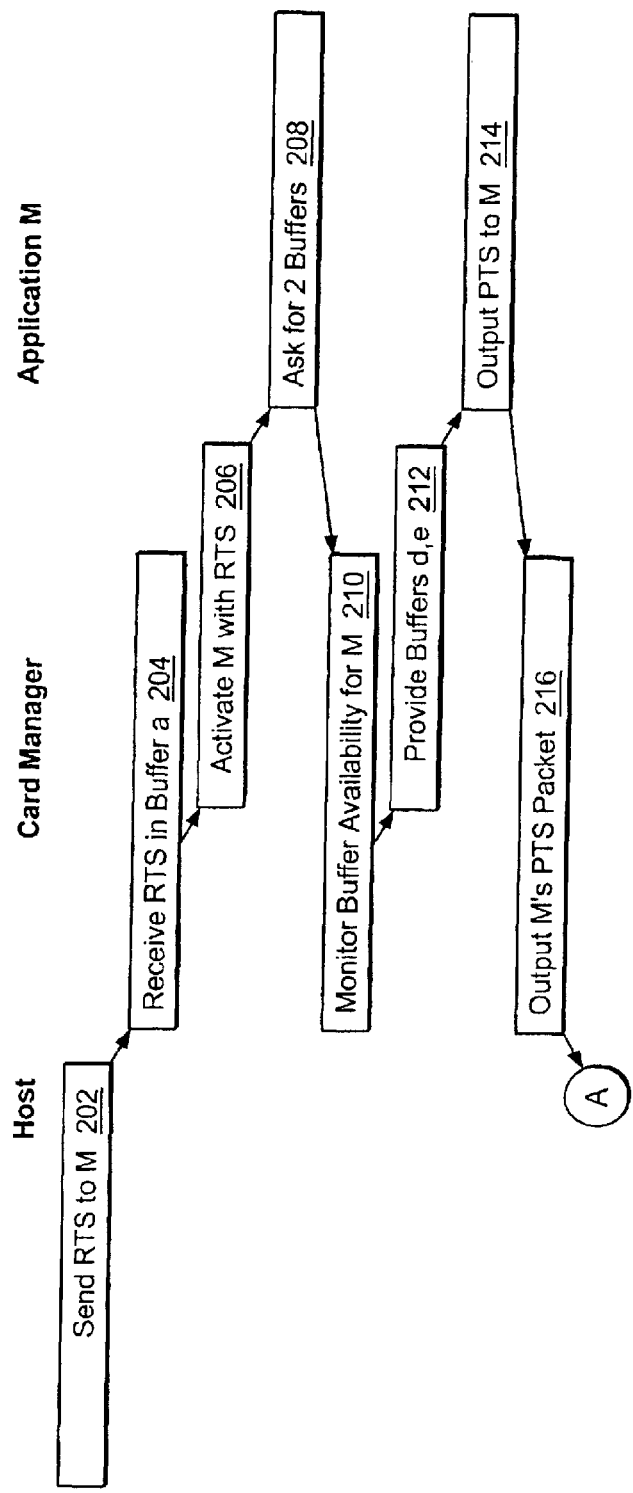

300  Two Applications - Single Packet Request/Single Packet Response

Swap Table 600

| Secondary Index 602 | Application Identification 604 | Primary Index 606 |
|---|---|---|
| 145 | 8 | 4 |
| 0 | 2 | 7 |
| 0 | 5 | 4 |

FIG. 21

Swap Table 600

| Secondary Index 602 | Application Identification 604 | Primary Index 606 |
|---|---|---|
| 0 | 8 | 4 |
| 0 | 2 | 7 |
| 337 | 5 | 4 |

FIG. 24

Swap Table 700

| Secondary Index 702 | Application Identification 704 | Primary Index 706 | RAM Location 708 |
|---|---|---|---|
| 0 | 8 | 4 | 6 |
| 0 | 2 | 7 | 2 |
| 337 | 5 | 4 | 0 |

FIG. 25

CONCURRENT COMMUNICATION WITH MULTIPLE APPLICATIONS ON A SMART CARD

BACKGROUND OF THE INVENTION

Smart cards are small, tamper resistant plastic cards that contain in them a central processing unit (CPU) and supporting hardware. They can be used, for example, as smart credit cards, or employee badges, or for thousands of other uses, by having different application programs on board.

In the international smart card standard ISO/IEC 7816-4, incorporated herein by reference in its entirety, one finds the concept of up to four logically independent communication channels with a smart card. The state each of these channels is kept separate from the state of each of the others. Thus, for example, the current file on one channel may be different from the current file on another channel. A command sent to the card on one channel must be completed before a command can be sent on another channel.

The EMV '96 smart card specification, incorporated herein by reference in its entirety, defines the notion of application selection wherein the card returns a list of all of the applications that are contained on the card. Also in EMV '96 is described a method of activating individual applications on the smart card. A command sent to one application must be completed before a command can be sent to another application.

U.S. Pat. No. 6,005,942 discloses a method for activating individual applications on a smart card. When an application is activated all communication with the smart card is directed to that application. To communicate with another application the currently activated application must be deactivated and the new application activated.

U.S. Pat. No. 6,052,690 discloses the notion of maintaining multiple independent contexts on a smart card and the notion of communicating with any one of these contexts.

U.S. Pat. No. 5,204,965 discloses the scheduling of tasks on a computer based on the availability of data needed by those tasks.

In summary, current art teaches "heavyweight" or "course grain" scheduling of applications on a smart card. One application must completely process a message sent to it before another application is started.

Currently, data to be processed by a smart card is transmitted by the terminal to the smart card in a single data block called an Application Protocol Data Unit (APDU). An APDU contains the data to be processed as well as the description of the type of processing that is to be performed. The data returned by the smart card to the terminal in response to an APDU is the result of applying the requested processing to the provided data. The size of the data block that can be provided to the smart card and retrieved from the smart card of the current art is typically less than or equal to 256 bytes. This restriction is due primarily to the limited amount of random access memory (RAM) in the smart card as it is the RAM memory that is used hold data as it is received into and sent out of the smart card.

U.S. Pat. No. 3,825,904 (among many other following) discloses a method of mapping pages of random access memory to and from disk storage in order to support programs whose memory needs in total exceed the size of the random access memory actually available on a computer.

In the ETSI international mobile telephony standards GSM 11.11 and 11.14, each of which is incorporated herein by reference in its entirety, one finds the concept of a method whereby a smart card and in particular a subscriber identity module (SIM) chip in a GSM mobile telephone can request services from the handset. The smart card can, in the process of responding to an APDU, stimulate the terminal to issue a FETCH APDU. The FETCH APDU provides the smart card with the ability to send a command to the terminal for execution. After the terminal has executed this command, the terminal returns the result of the execution to the smart card using a TERMINAL RESPONSE APDU. In a mobile telephone application, for example, the FETCH and TERMINAL RESPONSE APDUs are used to give commands to the handset, such as a command to display a message or to retrieve a keypad hit from the subscriber.

In addition, in a general technique known as data caching, data currently being used by a processor is stored in a manner that enables the processor to access it more quickly than when it resides in its assigned storage location. For example, a microprocessor chip may cache the instructions it executes in high-speed cache memory rather than return them to comparatively low-speed RAM memory in the expectation that recently executed instructions are more likely to be executed in the near future than instructions that have not been recently executed. Another example is the caching of Web pages on the World Wide Web where recently viewed pages are store closer (with respect transmission time on the network) to the computer on which they were viewed than the original network source of the pages.

In yet another general technique known as virtual memory, the amount of memory available to an application program is larger than the actual amount of memory on the processor on which it is running. Segments of the virtual memory space are swapped into and out of the actual memory of the processor from a non-memory device such as a hard disk as they are needed by the application.

While there are many applications of smart codes, one particular application is for its use in a mobile or cellular telephone.

SUMMARY OF THE INVENTION

A multi-application integrated circuit card ("smart card") contains a plurality of application programs. It is desirable for the entities communicating with the smart card to be able to conduct simultaneous independent communications with more than one of these programs. Current art holds that only one application can be communicating with entities outside the smart card at any one time. This restriction is due to a number of factors, including the fact that only one of the data messages of today's art can fit in the smart card's random access memory (RAM) at a time.

A system and method is hereby disclosed for simultaneously communicating with multiple individual applications on a smart card. The system and method employs fixed-size data packets and tightly couples the execution of applications and thereby communication with them with efficient management of the smart card's limited RAM memory.

The present invention provides "lightweight" or fine grain scheduling of applications. Packets comprising partial communication with multiple, concurrently running applications on the smart card can be intermixed on the single physical communication channel with the card. An additional benefit of the method of the disclosure is that multiple long-running applications can be concurrently active on the card.

As noted above current art includes the notion of multiple independent applications and multiple independent application execution contexts on a smart card. Current art also includes the notion of up to four independent logical communication channels to the card that can be used to communicate with applications on the smart card.

It would be natural to use these methods in combination and to thereby temporarily associate a communication channel with an application to achieve simultaneous communication with up to four applications. This requires the entity or entities communicating with applications on the smart card to maintain an up-to-date list of association of channels to applications. In effect, current art externalizes an important component of the management of the state of the smart card: the activation and scheduling of multiple applications on a smart card and the concurrent communication with them. This places an unnecessary burden on programs and systems using multi-application smart cards and, by exposing some internal state of the smart card, can weaken the security provided by the smart card.

The current disclosure teaches a system and method for moving the administration of simultaneous communication with multiple applications on a smart card onto the smart card itself. This simplifies communication with the applications on a smart card from the point of view of the entities using the smart card and at the same time makes more efficient use of the limited RAM memory and the physical communication channel with the smart card.

The smart card can associate each of its applications with an application index that is unique on that card. An application index provides shorthand identification for, and hence, faster access to, each application on the card. An application-identification packet is sent to the host for each application on the smart card, each application-identification packet identifying the application and providing the associated application index. In one embodiment, upon the start of a usage session, an application-identification packet for each application on the smart card is sent to the host upon the start of a usage session, which may include, for example, the application of power to the smart card, or the connection of the smart card to a host.

According to another aspect of the invention, an application that executes on a smart card receives a requesting packet from a host requesting to send information. The application declares its memory requirements. When the application is notified that its memory requirements have been satisfied, it sends to the host a permission packet such as a permission-to-send packet, at which time the application is ready to receive the information from the host.

According to yet another aspect of the invention, a smart card host sends a request-to-send packet to a smart card that is capable of having a plurality of applications. The packet is addressed to an application on the smart card. A permission-to-send packet is received from the addressed application once sufficient memory has been allocated to the addressed application. Information is then sent to the addressed application upon receiving, at the host, the permission-to-send packet.

A further embodiment of the present invention provides a protocol whereby blocks of data larger than will fit in the communication buffer of the random access memory (RAM) of an integrated circuit card ("smart card") can nonetheless be processed by the smart card. The protocol is also of use when multiple programs are sharing the RAM of a smart card and their total combined use of RAM exceeds the available physical RAM of the smart card. The disclosed protocol is compatible with existing smart card technology, standards, conventions and implementations.

Accordingly, with respect to one embodiment of the present invention, a smart card capable of having on it a plurality of applications, has a random access memory (RAM) that is logically partitioned into a plurality of memory blocks. A control program on the smart card allocates one or more memory blocks to one of the applications, upon a declaration from the application of its memory needs. The control program then schedules the applications for execution. Only those applications whose memory needs are currently satisfied are scheduled for execution.

The control program receives a request such as a request-to-send (RTS) packet from a host. The packet is addressed to a particular application, and the control program passes the requesting packet to the application. When the control program receives a permission such as a permission-to-send (PTS) packet from the addressed application after the addressed application has had its declared memory needs satisfied, the control program sends the permission packet to the host.

In a further embodiment, the control program maintains a list of outstanding permissions. Any incoming packet addressed to an application that, using this list, cannot be paired with a permission sent out the addressed application, is rejected.

The host can be, for example, a wireless communication device, which is meant to include any part of the device, for example, the handset, and is meant cover any variety of such devices including but not limited to cellular mobile telephones and personal digital assistants (PDAs).

In one embodiment, a virtual machine is used to execute one or more of the applications on the smart card. The control program communicates with the virtual machine to control scheduling to a predetermined granularity. For example, an application might be allowed to execute ten steps, or it might be allowed to execute just one step. The number of steps allowed may be fixed, or it may be determined once for each application or it may be determined repeatedly for every application just before executing the application.

Various scheduling algorithms such as round robin scheduling can be used. Alternatively, the control program can schedule just those applications that have incoming data. In yet another alternative, the control program schedules applications based on priorities assigned to the applications. Of course, various combinations of these and other scheduling algorithms can also be used.

A further embodiment of the present invention includes a capability called a swapper for swapping data pages between the smart card's memory (the primary storage) and a host, for example a mobile telephone handset (the secondary storage).

Using, for example, the method of ETSI GSM 11.14, the swapper causes a FETCH command to be issued from the host. Upon receiving a FETCH command from the host, a first set, e.g. a first block or page, of data is swapped out from the memory of the smart card back to the host. At the same time a request can be made for a second set of data from the secondary storage to be transferred back into the smart card. In this latter case, the requested second set of data is received from the secondary storage and is stored in the smart card's memory.

In one embodiment, a swap table is maintained in which each entry tracks, for a given application and memory page, the corresponding data stored in the secondary storage.

In another embodiment, an extended swap table is maintained in which each entry tracks, for a given application and logical page, corresponding data stored in the secondary storage and a corresponding physical page location where the data is stored in primary storage, i.e., the smart card's memory, thus providing a level of indirection.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 21 is a schematic diagram of an exemplary swap table maintained by the smart card operating system, in an embodiment of the present invention, to track application pages.

FIG. 24 is a schematic diagram of the swap table of FIG. 20 which has been updated after receiving the data in the TERMINAL RESPONSE APDU of FIG. 22.

FIG. 25 is a schematic diagram illustrating an embodiment an extended swap table 700.

DETAILED DESCRIPTION OF THE INVENTION

An integrated circuit card ("smart card") is typically a small plastic card about the size of and having the appearance of a credit card, with a microprocessor and supporting hardware built in, as well as one or more applications to be executed by the processor. Other smart cards can be even smaller than credit cards, depending on their intended use.

Figure 1:
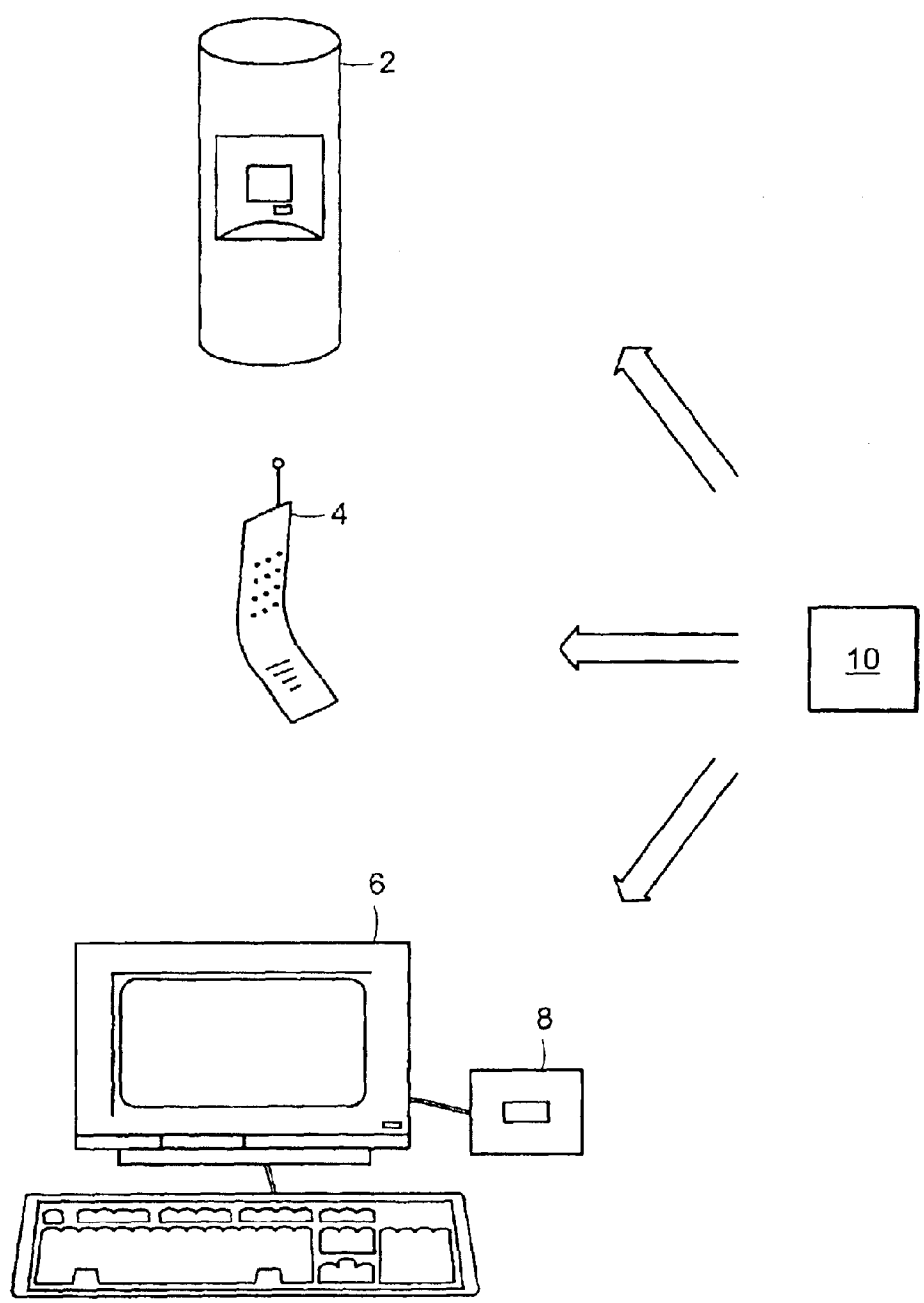
FIG. 1 is a schematic diagram illustrating several typical uses of a smart card.

FIG. 1 is a schematic diagram illustrating several typical uses of a smart card 10. For example, a credit card-type of smart card can be used to access an ATM or kiosk 2. Another application of smart cards is within various appliances, including mobile telephones 4, in which a smart card serves as a subscriber identity module (SIM), holding user-specific information such as the subscriber's account information. In yet another application, a smart card 10 can be presented to a smart card reader 8 attached to a computer 6. Depending on the type of smart card, the reader might read the smart card through electrical contacts or through some other, wireless means.

The terms "host" and "terminal" are used herein interchangeably and are meant to represent devices that connect to a smart card, including but not limited to kiosks, ATMs, mobile telephones, appliances and computers.

Concurrent Communication with Multiple Applications

Figure 2:
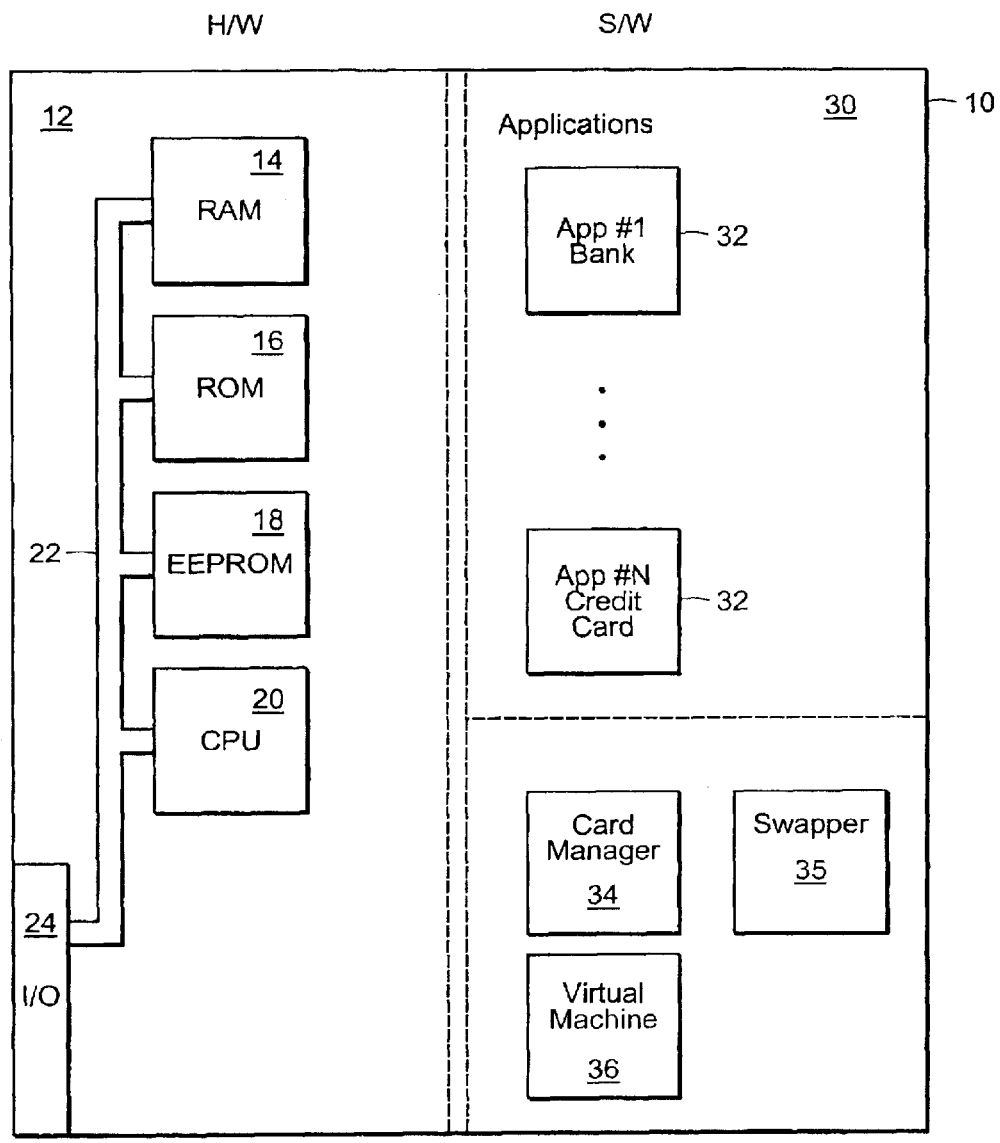
FIG. 2 is a high-level schematic diagram of an embodiment of the present invention within a smart card.

FIG. 2 is a high-level schematic diagram of an embodiment of the present invention within a smart card 10. The smart card 10 is shown logically split between hardware 12 and software 30. Only those aspects important to the present invention are shown.

On the hardware side 12, a central processing unit (CPU) 20 is connected via a bus 22 to various types of memory and an input/output (I/O) port 24. The memory in a smart card typically comprises random access memory (RAM) 14, read-only memory (ROM) 16 and non-volatile memory 18 such as electronically erasable programmable read-only memory (EEPROM). The I/O port 24 is used to connect to an external device such as a terminal or a mobile telephone handset. The CPU, memory and I/O port driver are typically realized on one integrated circuit.

On the software side 30, there are one or more applications 32, typically written in a language to be interpreted by a virtual machine 36. For example, one application might be a banking application, while another is a credit card application, and so on. A system program called a card manager 34 coordinates the activation and scheduling of applications and communication with them. At least one embodiment of the present invention also has a swapper 35 for utilizing external memory.

Figure 3:
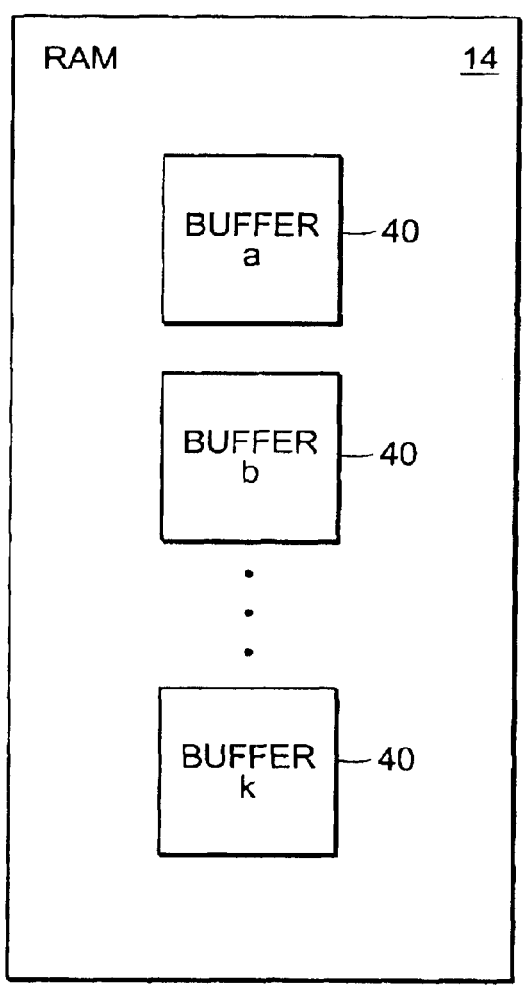
FIG. 3 is a schematic diagram illustrating that at least a portion of the RAM of FIG. 2 is logically divided into several buffers.

FIG. 3 is a schematic diagram illustrating that at least a portion of the RAM 14 of FIG. 2 is logically divided into several buffers 40. One or more buffers 40 can be assigned to an application 32 according to the application's needs.

Figure 4:
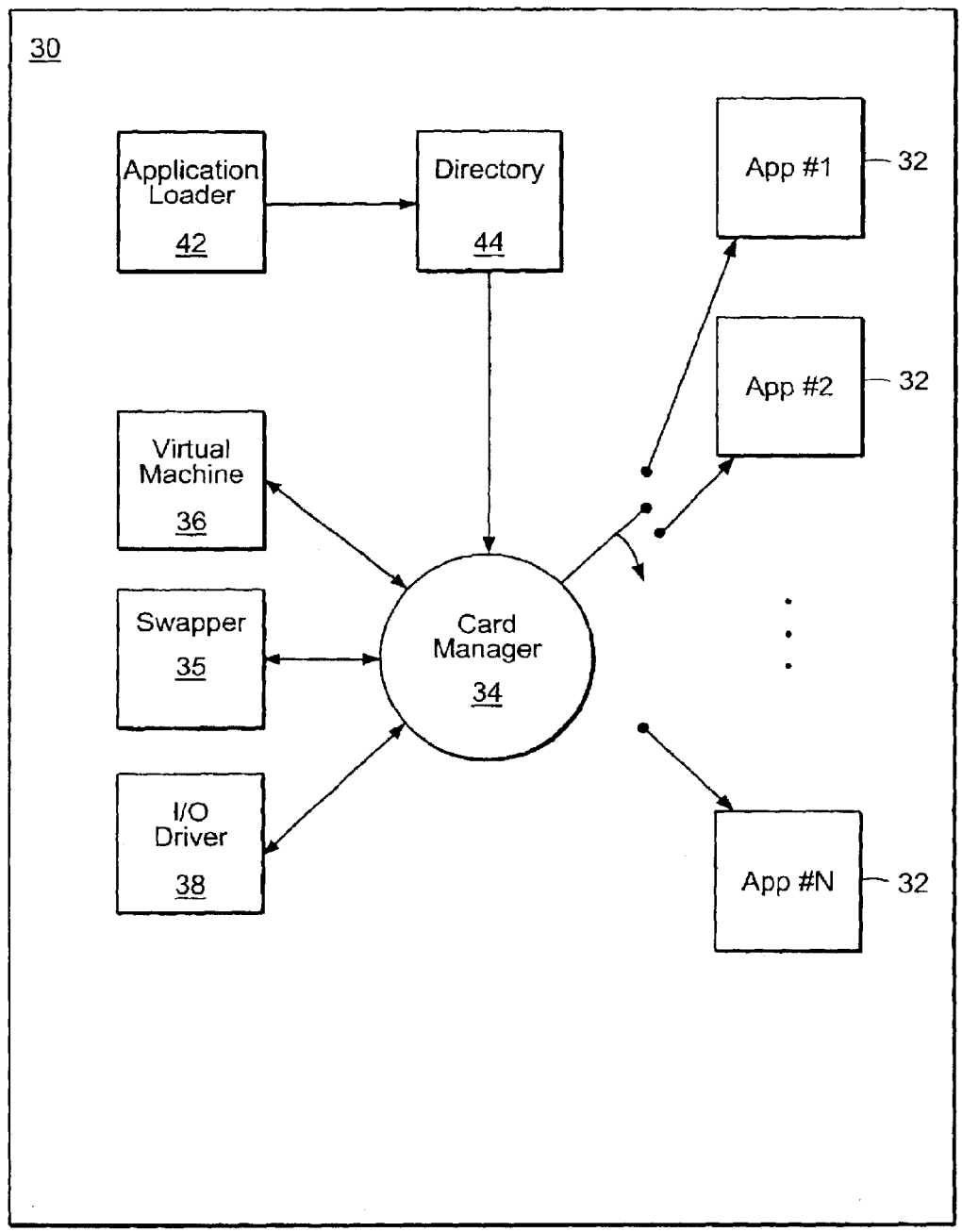
FIG. 4 is a schematic diagram of the software of the smart card of FIG. 2.

FIG. 4 is a schematic diagram of the software 30 of the smart card of FIG. 2. The card manager 34 maintains a directory 44 of all of the applications 32 on the smart card and is able to place any of these applications into execution. The order in which the applications are placed in execution by the card manager is not fixed, and determining which application to place into execution next is a function of the scheduling capability of the card manager.

The card manager also controls all communication into and out of the smart card. When data is sent from outside the smart card to an application on the smart card, the data is first received, through an I/O driver 38, by the card manager 34 and later passed to the target application 32. Similarly, when an application 32 on the smart card wishes to pass data to an outside entity, the data is passed to the card manager 34 that later sends it out on the smart card's communication channel via the I/O driver 38.

New applications are loaded into the smart card by a loader application 42, which updates the directory of applications 44.

The present invention provides tight linkage between the communication with smart card applications, allocation of scarce resources within the smart card, and the scheduling of execution of those applications. The system and method is constructed to embrace and be compatible with current modes of smart card usage.

In one particular embodiment, all communication with the card manager 34 and hence with applications 32 on the smart card is formatted as packets of fixed number of bytes, e.g., sixteen bytes.

Of course, one skilled in the art would recognize that in other embodiments, packet types may have different sizes, or all packets may be of various sizes by using different methods of delimiting.

Figure 5:
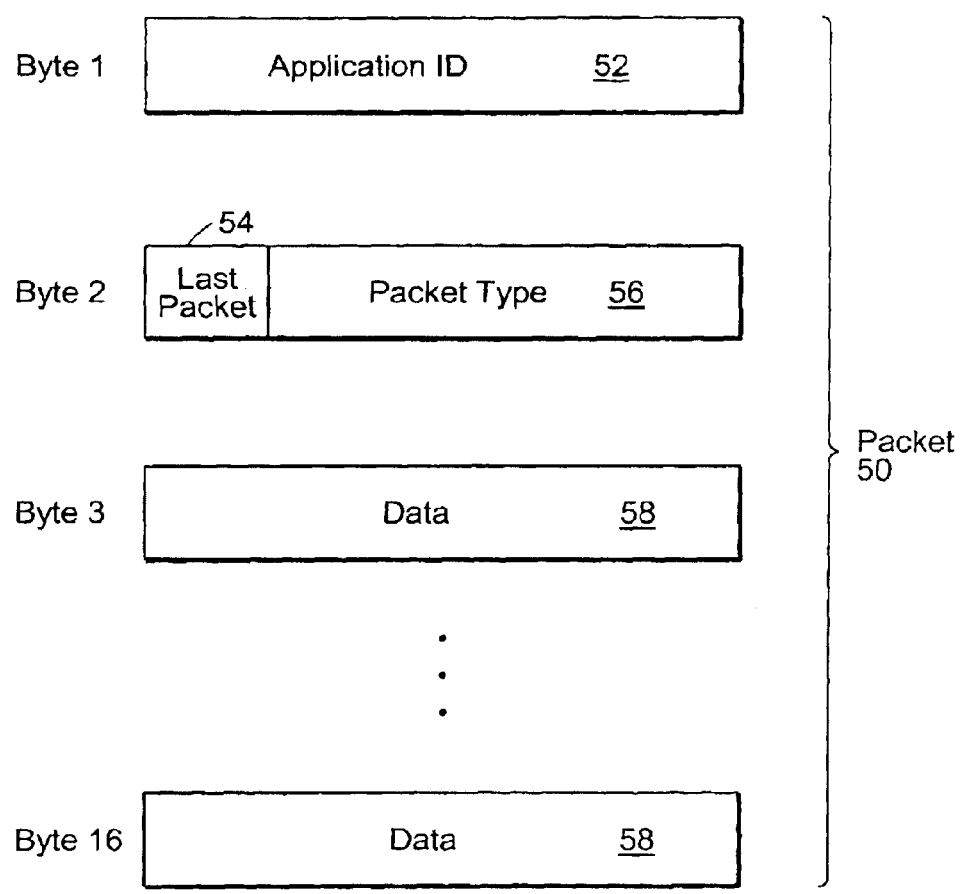
FIG. 5 is a schematic diagram illustrating a packet as employed by an embodiment of the present invention.

FIG. 5 is a schematic diagram illustrating a packet as employed by an embodiment of the present invention. The first byte of an incoming packet 50 holds the application index 52 of the application 32 for which the packet is intended. Similarly, the first byte of an outgoing packet indicates the application from which the packet is being sent.

The second byte contains a packet type field 56 that indicates the type of the packet. In addition, the high bit 54 of the second byte holds the value 1 to indicate that this packet is not the last packet of a series of packets comprising this data transfer. If the high bit 54 is 0, then this is last packet, and perhaps the only packet, of the data transfer. A sequence of packets with all but the last having the high bit 54 of the second byte set to 1 and the last packet having the bit 54 set to 0 is called a "packet chain."

The remaining bytes, if any, contain the actual data 58 being sent to or from the smart card application.

Figure 6:
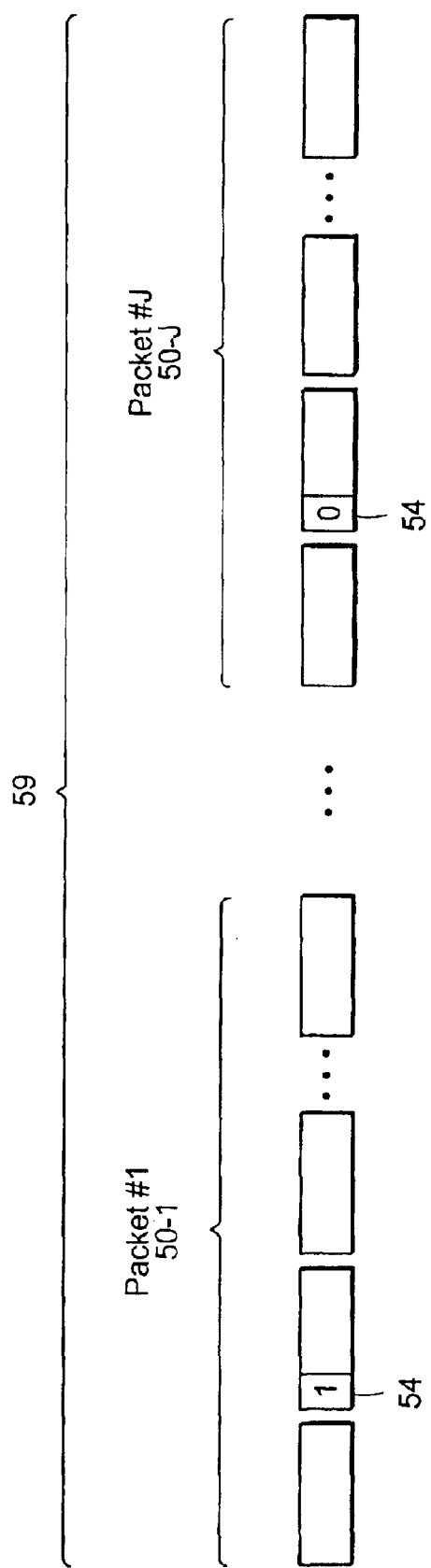
FIG. 6 is a schematic diagram illustrating a packet chain.

FIG. 6 is a schematic diagram illustrating a packet chain 59. The packet chain 59 comprises a series of packets, here shown as Packet #1 50-1 through Packet #J 50-J. Each packet 50 has the high bit 54 of its second byte set to 1, except for the last packet 50-J, which has the bit 54 set to 0 to indicate the end of the packet chain 59.

In one embodiment of the present invention, the master-slave relationship between the host computer and the smart card found in current smart card implementations and smart card standards and specifications is preserved. Thus, the terminal or host computer into which the card is inserted or otherwise presented initiates all communication with the smart card. The host computer can regularly poll the card to see if there is data waiting to be sent from the card.

Alternatively, a low-level protocol such as that defined in ESTI GSM 11.11 and 11.14 can allow the card to respond a request from the host in a manner that indicates that additional messages are waiting to be transferred from the card to the host.

In either case, the host maintains regular communication with the smart card so that if the card generates one or more messages, these messages can be successfully passed out of the card and onto the host.

First, several key packet types are discussed, followed by a discussion of scheduling of applications. It should be noted that the present invention is not limited to the packet types discussed and in fact assumes that new types can and will be defined in the future as needed.

Figure 7:
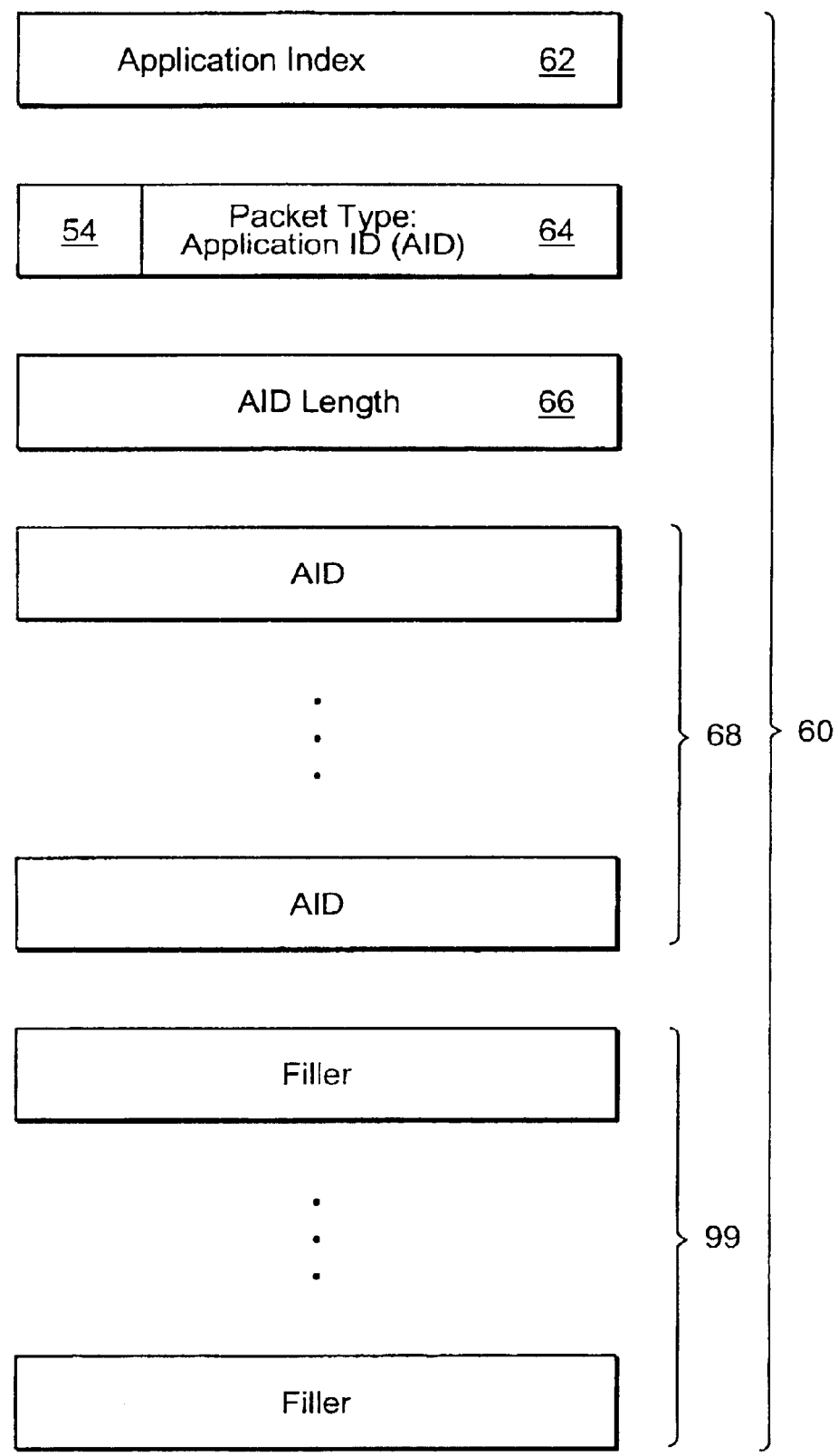
FIG. 7 is a schematic diagram illustrating an Initialization and Application-Identification packet of the present invention.

FIG. 7 is a schematic diagram illustrating an Initialization and Application-Identification packet of the present invention. When a smart card is electrically activated, for example at the start of a usage session or when a mobile telephone is switched on, the card manager 34 sends to the host computer an application-identification packet 60 for each application 32 on the smart card that identifies the application. The first byte of this application identification packet 60 contains the application index 62 used to reference the corresponding application on the particular smart card.

The second byte contains the application identification packet type code 64. The data bytes of the packet 60 contain the application's globally unique integrated circuit card Application Identifier or AID as specified by ISO/IEC 7816-5 and ISO/IEC 7816-6, both of which are incorporated by reference herein in the their entirety. The first byte is the length 66 of the AID and the remaining bytes 68 up to the specified length are the AID itself.

In one embodiment of the present invention, application index 0 is reserved for the card manager 34 itself. The card manager's identification packet is normally the first application-identification packet issued after electrical reset. In one embodiment, the AID of the card manager is the 9-byte value A0 00 00 00 92 00 00 00 0A.

In an embodiment where packets are of fixed length, one or more filler bytes 99 can be attached to the packet to bring it to the required length. Of course, if the information consumes the entire packet, then no filler bytes are necessary.

At the end of the initialization and application identification phase, the entities wishing to communicate with applications on the card know what applications are available and have one-byte application indexes to uniquely and efficiently identify the applications on the particular smart card at hand.

Figure 8:
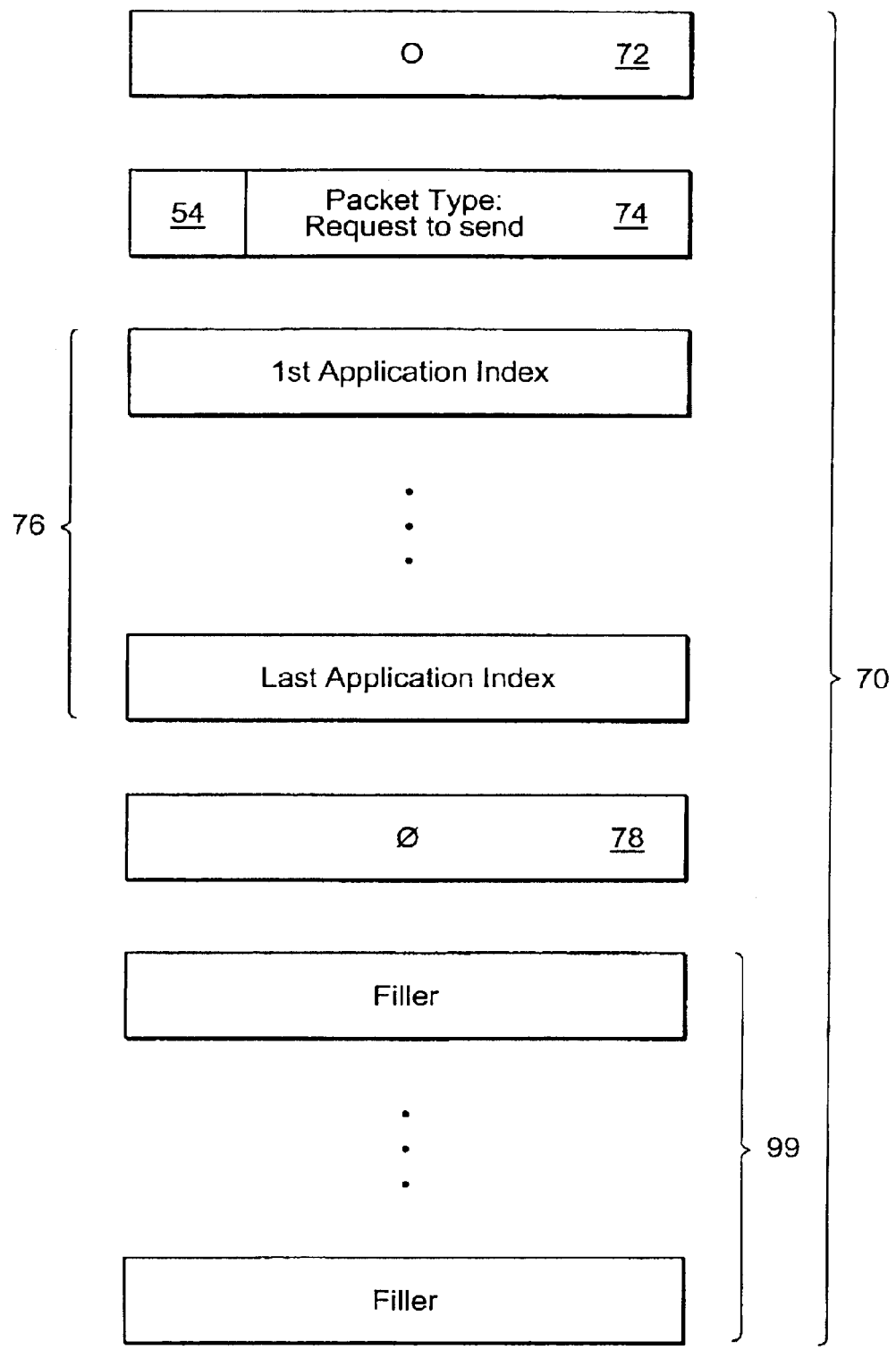
FIG. 8 is a schematic diagram illustrating a Request-to-Send packet of the present invention.

FIG. 8 is a schematic diagram illustrating a Request-to-Send packet 70 of the present invention. A Request-to-Send packet 70 is sent from the host computer to the card and addressed to the card manager 34, i.e., the application index 72 is 0. The packet type field holds a Request-to-Send value 74. The packet's data comprises a list 76 of applications for which packets are waiting on the host side. The list 76 is terminated by a null byte 78, and possibly followed by one or more filler bytes 99.

Upon receipt of a Request-to-Send packet 70, the card manager 34 notifies each of the listed applications in turn that incoming data is available. The host then expects to receive a permission-to-send packet, described next, from each of these applications, when the application is ready to receive this data.

Figure 9:
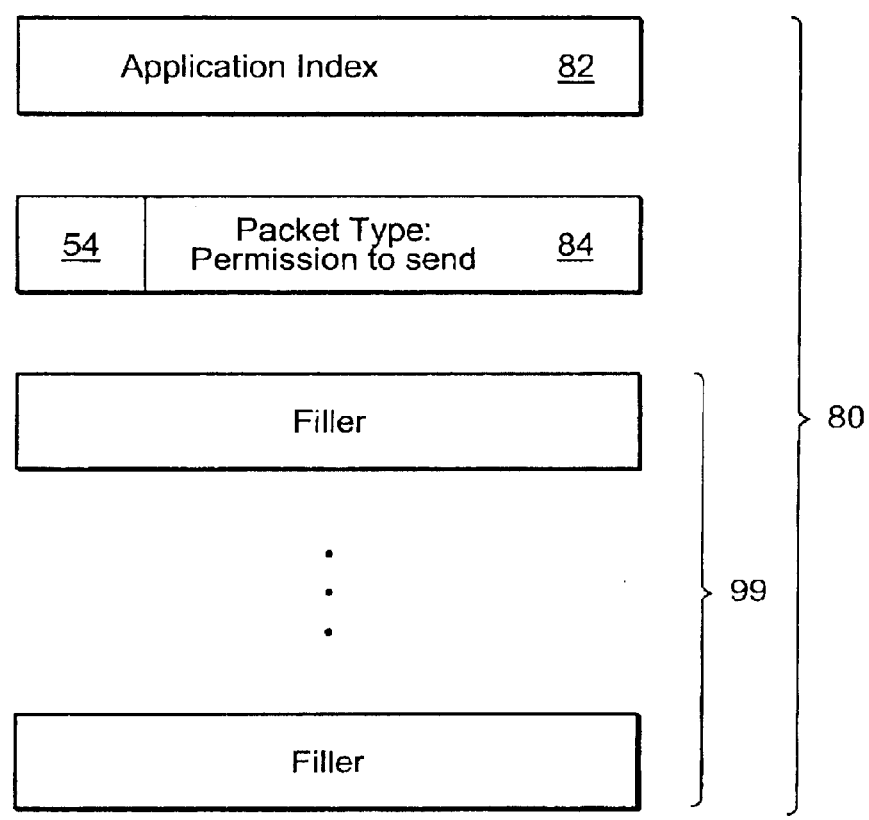
FIG. 9 is a schematic diagram of a Permission-to-Send packet of the present invention.

FIG. 9 is a schematic diagram of a Permission-to-Send packet 80 of the present invention. The first byte contains the application index 82 of the application sending the packet 80. The second byte contains the Permission-to-Send packet type 84.

Because the RAM memory on a smart card is limited, there is not room to buffer on the card itself at one time all of the data going to and coming from all of the applications on the smart card. The more extensive EEPROM memory is not used for such transient data due to the long write times it requires. Thus, a method is needed to manage the RAM memory on the smart card.

The card manager 34 adopts the convention that each application 32 is programmed to explicitly determine its own input, output and temporary storage memory requirements. When activated, an application 32 attempts to fulfill its memory buffer requirements by requesting temporary use of RAM memory blocks 40 from the card manager 34. Entities outside the smart card may only send data to an application after the application has satisfied its memory needs.

When an application's memory needs are satisfied, the application issues a Permission-to-Send packet 80. The terminal or host computer must be in possession of such a packet in order to send data to the application. In one embodiment, one permission is required for each packet. Depending on the expected level of compliance with this protocol by the host computer, the card manager 34 may keep a list of outstanding Permission-to-Send packets 80 and reject any incoming packets that cannot be paired with a Permission-to-Send packet.

There is always an implicit outstanding permission to send for application index 0, the card manager itself, as it is always possible to send at least one packet directly to the card manager.

Figure 10:
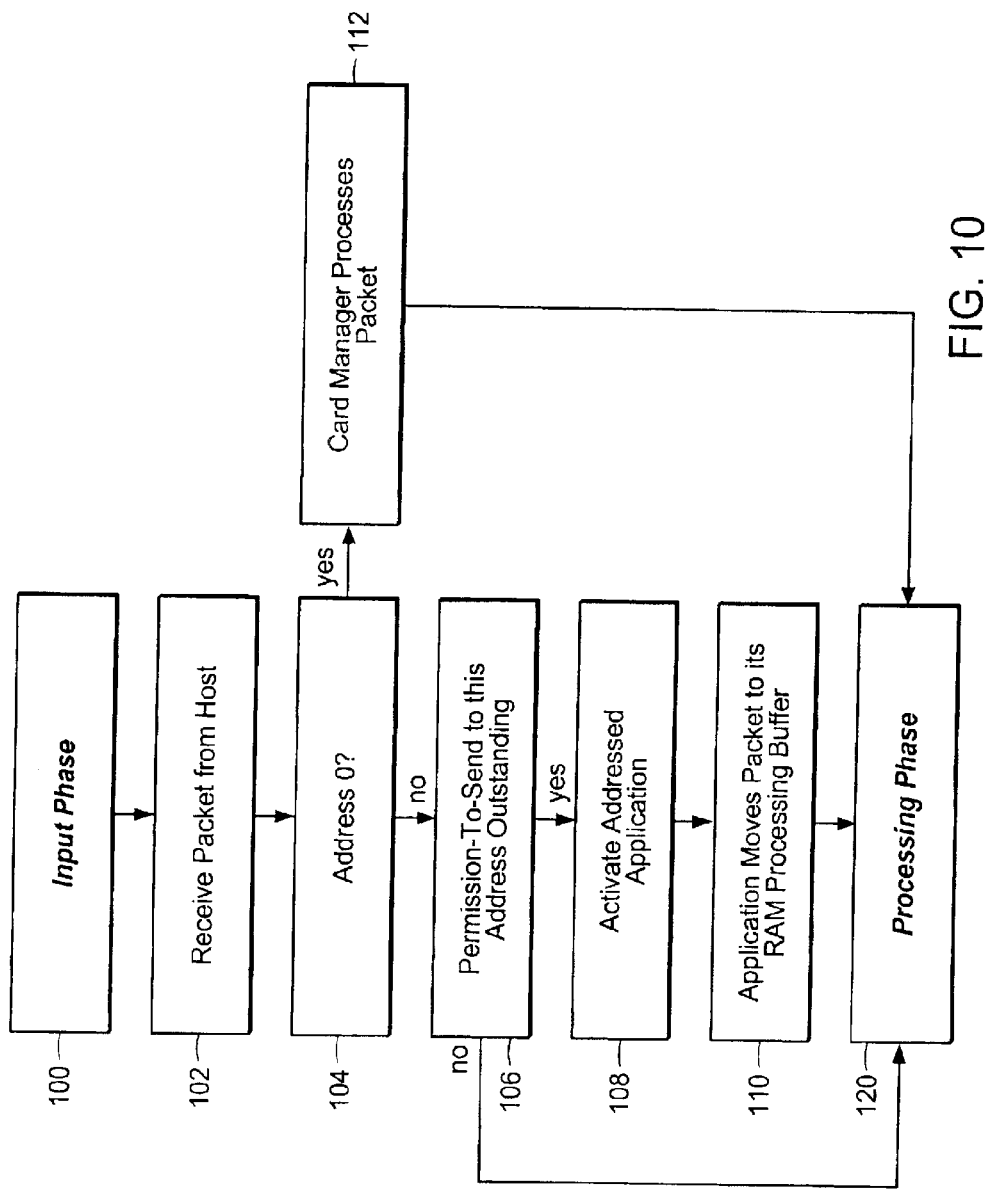
FIG. 10 is a flowchart, illustrating at a high level, the input phase of the card manager of the present invention, which begins when a packet is received from the host.

FIG. 10 is a flowchart, illustrating at a high level, the card manager's input phase 100, which begins when a packet is received from the host, as in step 102. In step 104, the application index is examined. If the application index is 0, the packet is intended for the card manager, which then processes the packet (step 112) and then enters the processing phase 120.

If, on the other hand, the application index is not 0, the packet is intended for an application. The card manager first looks to see if there is an outstanding Permission-to-Send to the application with this application index (step 106). If not, the packet will not be delivered, and the card manager again proceeds to the processing phase 120.

If there is an outstanding Permission-to-Send to the application with this application index, then the application is activated at step 108. The activated application then, at step 110, moves the received packet to a RAM buffer that has been assigned to the application. This is done because typically a fixed portion of the RAM that is used for a communication buffer. Bytes must be moved out of this buffer to free up the buffer for further communication while the application works on the data.

Finally, after moving the data to an assigned buffer, the card manager proceeds to the processing phase 120.

Figure 11:
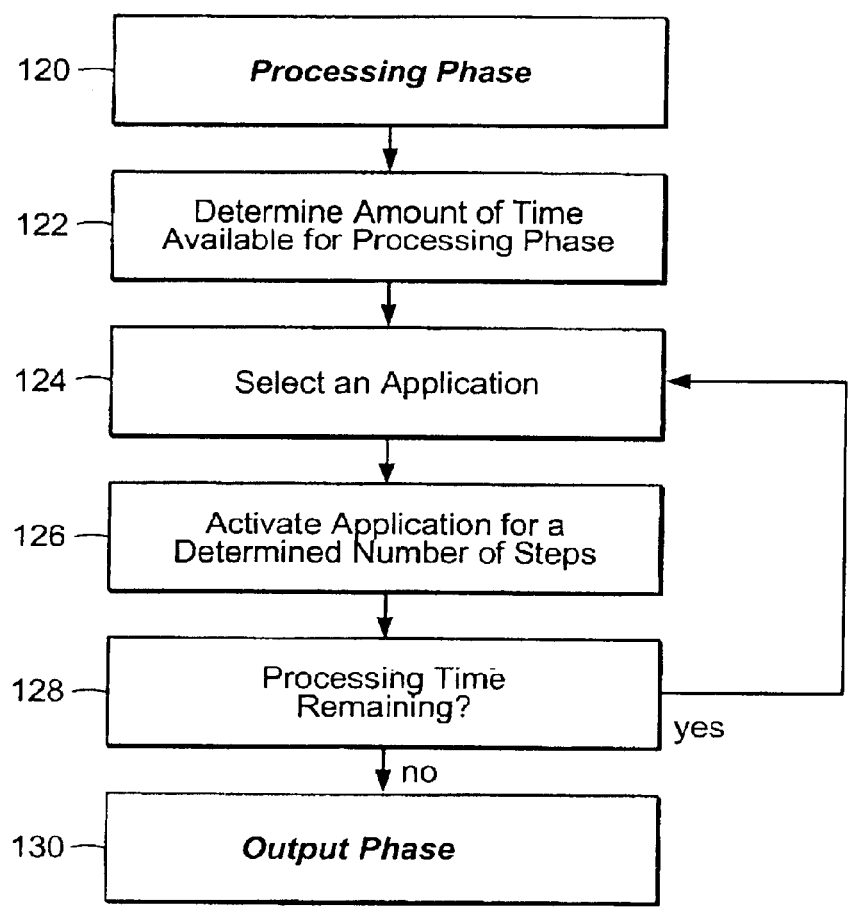
FIG. 11 is a flowchart, illustrating at a high level, the processing phase of the card manager of the present invention.

FIG. 11 is a flowchart, illustrating at a high level, the card manager's processing phase 120. First, at step 122, the amount of time available for the processing phase 120 is determined. In one embodiment, the total time available is fixed by the need to respond to the handset or other host within a specified period.

At step 124, an application is selected according to some scheduling algorithm, discussed below.

At step 126, the selected application is activated and allowed to run for some number of steps that may be determined, for example, each time through the loop of steps 124 through 128, based on various information, or may, for example, be fixed. After the predetermined amount of time, the application is de-activated, and the card manager, at step 128, determines whether there remains any time for further processing. If some time is still available, the card manager goes back to step 124 and selects another application. The loop of steps 124 through 128 repeats until no time remains, at which point the card manager enters the output phase 130.

Figure 12:
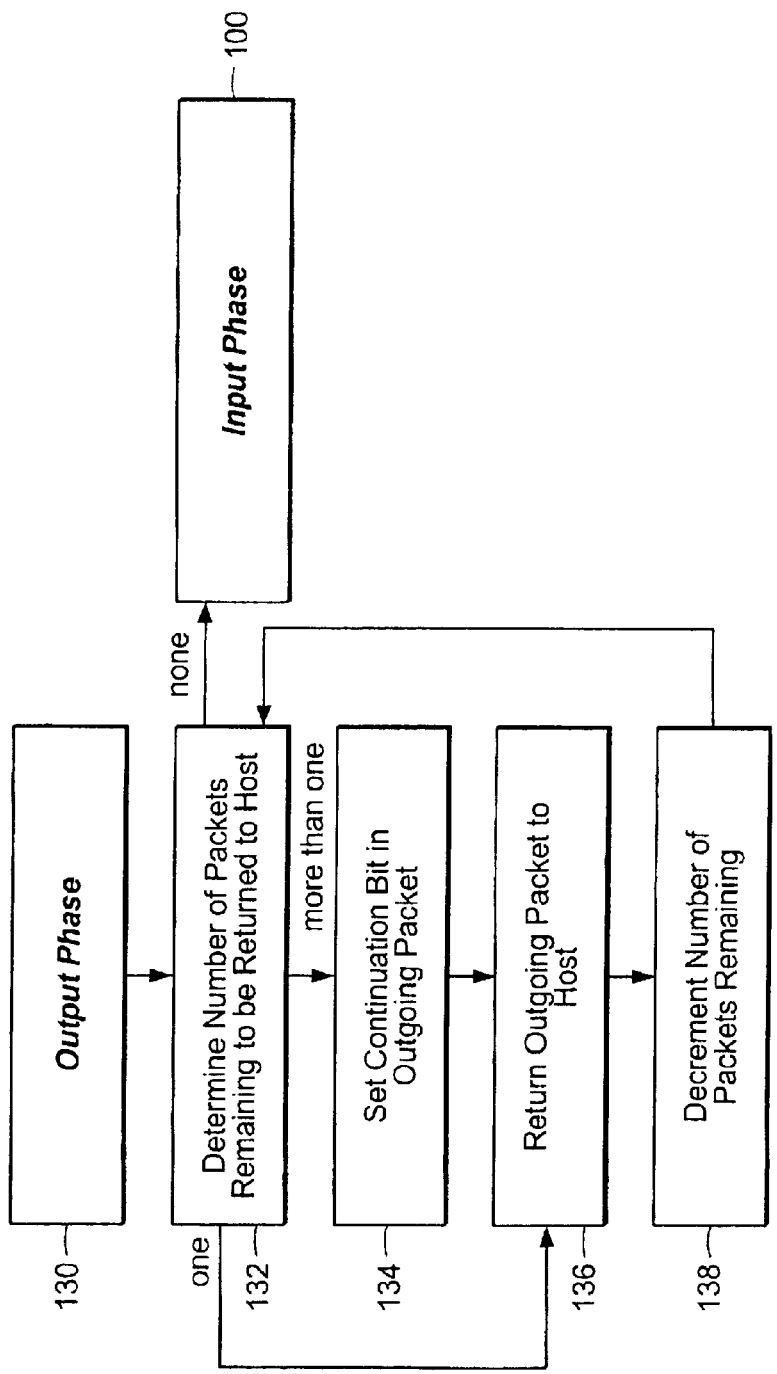
FIG. 12 is a flowchart, illustrating at a high level, the output phase of the card manager of the present invention.

FIG. 12 is a flowchart, illustrating at a high level, the card manager's output phase 130. First, at step 132, the card manager determines the number of packets remaining that need to be sent to the host. When there are no such packets remaining, this phase 130 is complete and the card manager returns to the input phase 100 of FIG. 10.

If there is more than one packet remaining, then at step 134, the continuation bit 54 is set to 1 to indicate that this packet is not the last packet of the outgoing packet chain. When there is only one packet remaining, step 134 is skipped so that the continuation bit 54 is clear. i.e., set to 0, indicating the end of the packet chain. In either case, at step 136, the outgoing packet is sent to the host, and the number of packets remaining is decremented (step 138). The loop of steps 132 through 138 is repeated until the last packet is sent to the host.

The primary purpose of the card manager 34 is to make the most efficient use of the limited RAM 14 in a smart card, the modest computational capabilities of the smart card and the relatively slow physical communication channel between the smart card and the outside world. The card manager 34 accomplishes this by controlling the order in which it selects (step 124) and activates (step 126) applications. The data and rules that the card manager uses to determine which application to activate next are together called a "scheduling regimen."

There are many known scheduling regimens that can be implemented by the card manager. One example of a scheduling regimen is called round-robin scheduling wherein each application is activated in turn regardless of whether or not there is data waiting for it.

Another example of a scheduling regimen is called data-flow scheduling wherein an application is scheduled if and only if there is incoming data for it. In this case, applications are scheduled in the order in which data arrives for them.

Among the scarce resources on the smart card, the resource for which there is the most contention in today's multi-application smart cards is RAM memory. The primary use of RAM memory in a smart card is to hold incoming data, as it is being processed and outgoing data as it is being constructed. Basing the application-scheduling regimen jointly on RAM memory demand and communication demand therefore yields an application execution environment that makes efficient use of the scarce RAM resource.

The scheduling regimen disclosed herein can be combined with other scheduling regimens found in the literature. One such example is priority-based scheduling. In priority-based scheduling, each application is assigned a priority number. Applications with higher priority number are executed in preference to applications with lower priority numbers. Such a combination of the resource optimization regimen described above with a priority regimen could, for example, be useful on the Subscriber Identity Module (SIM) smart card in mobile telephones. Here, applications concerned with network access and performance are given higher priority than applications that are only interacting with the subscriber.

Many smart cards run application programs using a software program called a byte code interpreter or a virtual machine inside the smart card. The instructions implementing the application, called byte codes do not correspond to the instructions of the smart card's hardware processor and therefore cannot be directly executed by the hardware. The byte code interpreter program that reads and then executes, i.e., interprets, the application's byte code instructions one byte code at a time, realizes the execution of the application program. Virtual machines open the possibility of very fine grain application scheduling—down to the individual byte code.

Scheduling regimens are classified in the art as being deterministic or non-deterministic and preemptive or non-preemptive. Generally speaking, deterministic regimens maintain some sense of time whereas non-deterministic regimens do not. Preemptive regimens permit the operating system to interrupt the execution an application at any moment whereas a non-preemptive regimens let the application run until relinquishes control of the processor voluntarily.

Since the virtual machine is part of the operating system on the smart card, it is possible to consult the scheduling regimen before and after the interpretation of each byte code. In this way the card manager can support deterministic, preemptive and non-preemptive scheduling on the smart card. Counting the number of byte code instructions executed and interrupting the application after a fixed number can achieve rough time determinism. If a finer grain time determinism is required, the time to execute each byte code can be tallied as the byte code is interpreted. Preemption can be achieved by interrupting the application after the completion of the interpretation of a byte code instruction.

Figure 13:
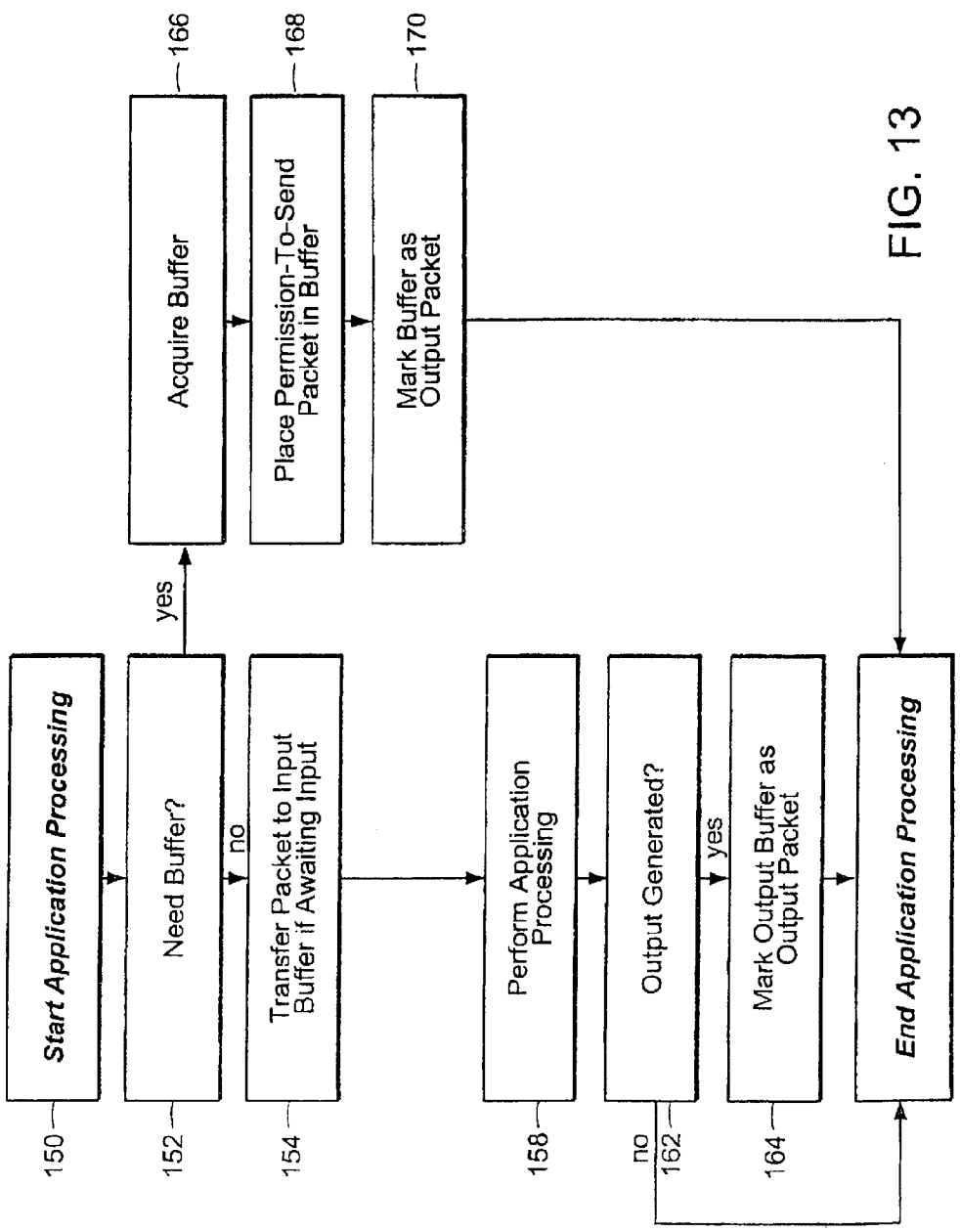
FIG. 13 is a flowchart illustrating at a high level, application processing according to an embodiment of the present invention.

FIG. 13 is a flowchart illustrating at a high level, application processing 150 according to an embodiment of the present invention. From the point of view of the application, the application is running continuously until it is complete. An application is not aware that it is being preempted.

The application, then, at step 152, first determines whether it needs one or more buffers. If it does, then at step 166 it acquires the necessary number of buffers, by requesting the buffers from the card manager. The card manager puts the application to sleep until the request can be satisfied, at which time the card manager assigns the requested number of buffers to the application and notifies the application as to which buffers have been assigned. Then, at step 168, the application places a Permission-to-Send packet 84 (FIG. 9) into a buffer and, at step 170, marks the buffer as containing an output packet. The application processing is then finished until the host responds.

If, on the other hand, no input buffers are needed at step 152, then at step 154, the application transfers a received packet to one of its input buffers. Next, at step 158, the application processes the data that has been made available to it.

When the application has completed processing the data at step 158, it determines, at step 162, whether any output has been generated. If no output has been generated, then the application is complete. Otherwise, the buffer holding the generated output is marked as an output buffer, for example, by setting an appropriate buffer status flag. In one embodiment, when an application returns control to the card manager, the card manager scans an array of buffer status flags and outputs all of the buffers that are marked as output packets, i.e., buffers that hold output packets ready to be returned to the host.

Figure 14B:
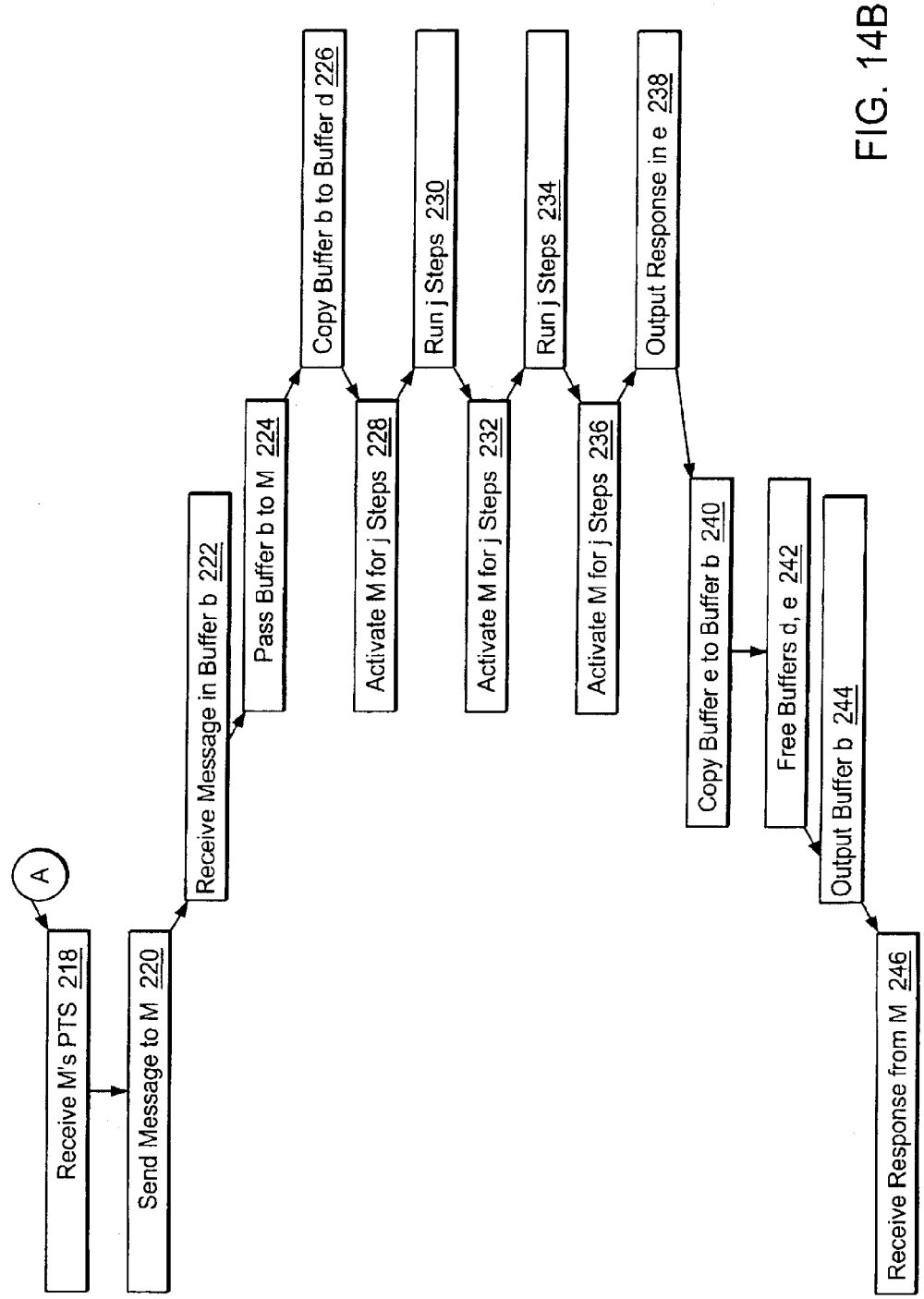
FIG. 14 is a schematic diagram of a timeline illustrating the operation of an embodiment of the present invention for the simple exemplary case of a host communicating with one application on the smart card.

FIG. 14 is a schematic diagram of a timeline 200, with time going down, illustrating the operation of an embodiment of the present invention for the simple exemplary case of a host communicating with one application on the smart card.

At step 202, the host sends a Request-to-Send packet 70 (FIG. 8) addressed to Application M. The card manager receives the request in Buffer a (step 204) and activates Application M (step 206) with the request. Application M determines that it requires two buffers in order to perform its operation, and at step 208, asks the card manager for two buffers.

At step 210, the card manager monitors the availability of the buffers. When two buffers, Buffers d and e, become available, the card manager assigns them to Application M (step 212). Application M then outputs (step 214) a Permission-to-Send 80 (FIG. 9), which the card manager relays (step 216) to the host, which receives the packet 80 at step 218.

The host then sends a data message to Application M (step 220). The card manager, at step 22, intercepts the message, stores the message in Buffer b, and passes Buffer b to Application M. Application M copies the data to its assigned Buffer d (step 226).

At step 228, the card manager 34 activates Application M for some number of steps or byte codes, or for a fixed time, and in step 230, Application M responds by executing the allowed number of steps (j). This is repeated at steps 232 and 234. At step 236, the card manager 34 again activates Application M for j steps, but this time, at step 238, Application M outputs a response into Buffer e.

The card manager then copies the content of Buffer e to Buffer b (step 240), frees Buffers d and e (step 242) and finally outputs Buffer b (step 244) to the host, where it is received, at step 246.

Figure 15:
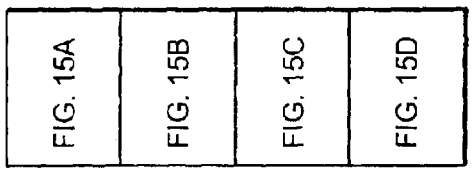
FIG. 15 is a schematic diagram of a timeline illustrating the operation of an embodiment of the present invention for an exemplary case of simultaneous communication between a host and two applications on the smart card.
Figure 15A:
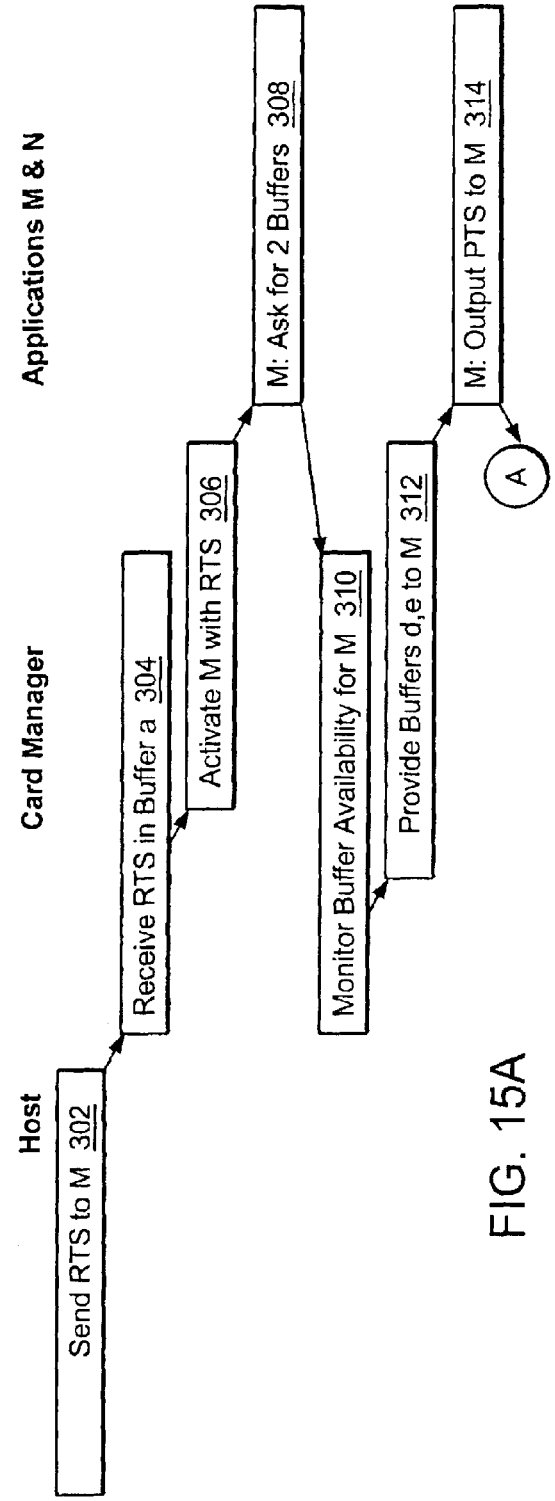
Figure 15B:
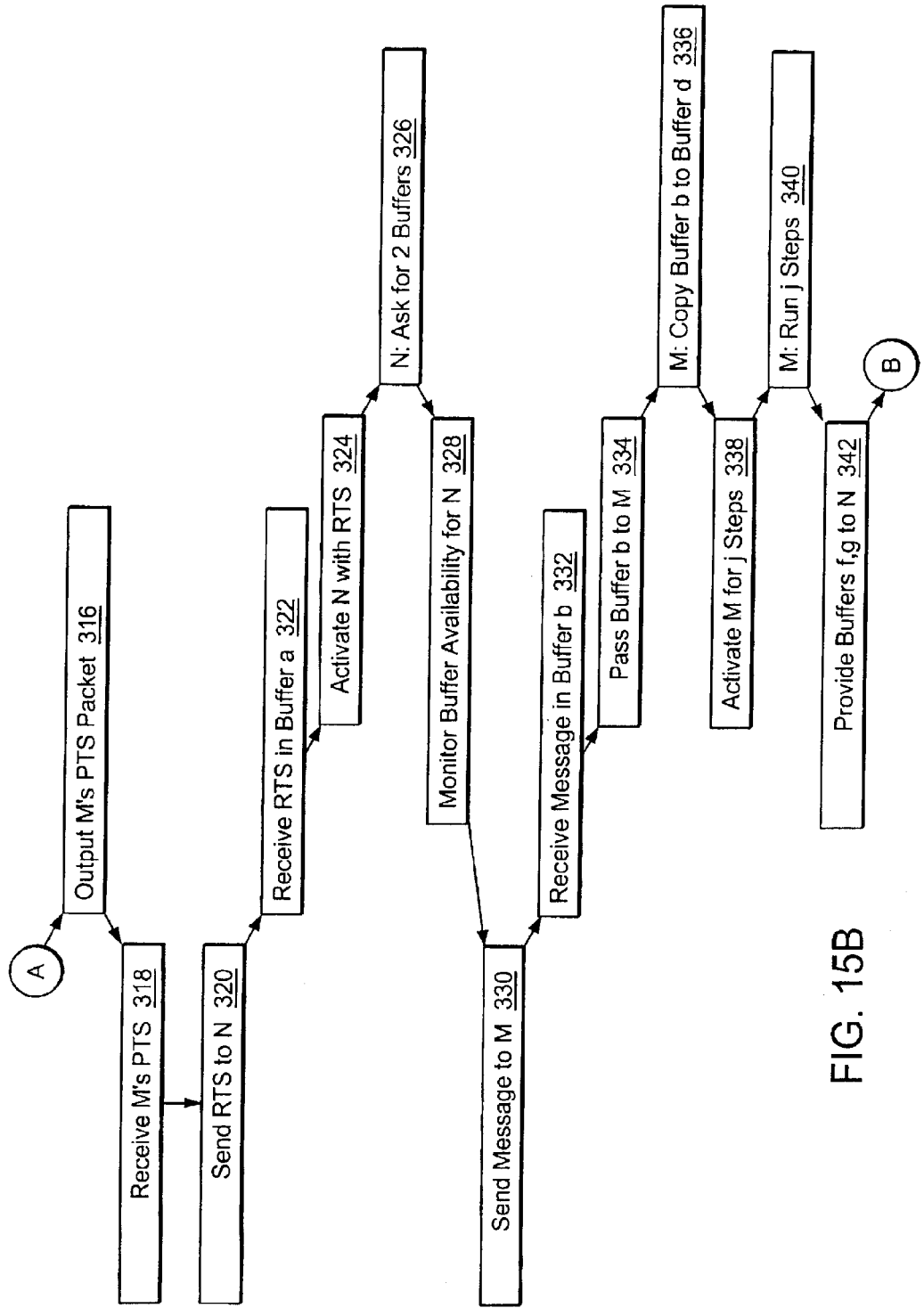
Figure 15C:
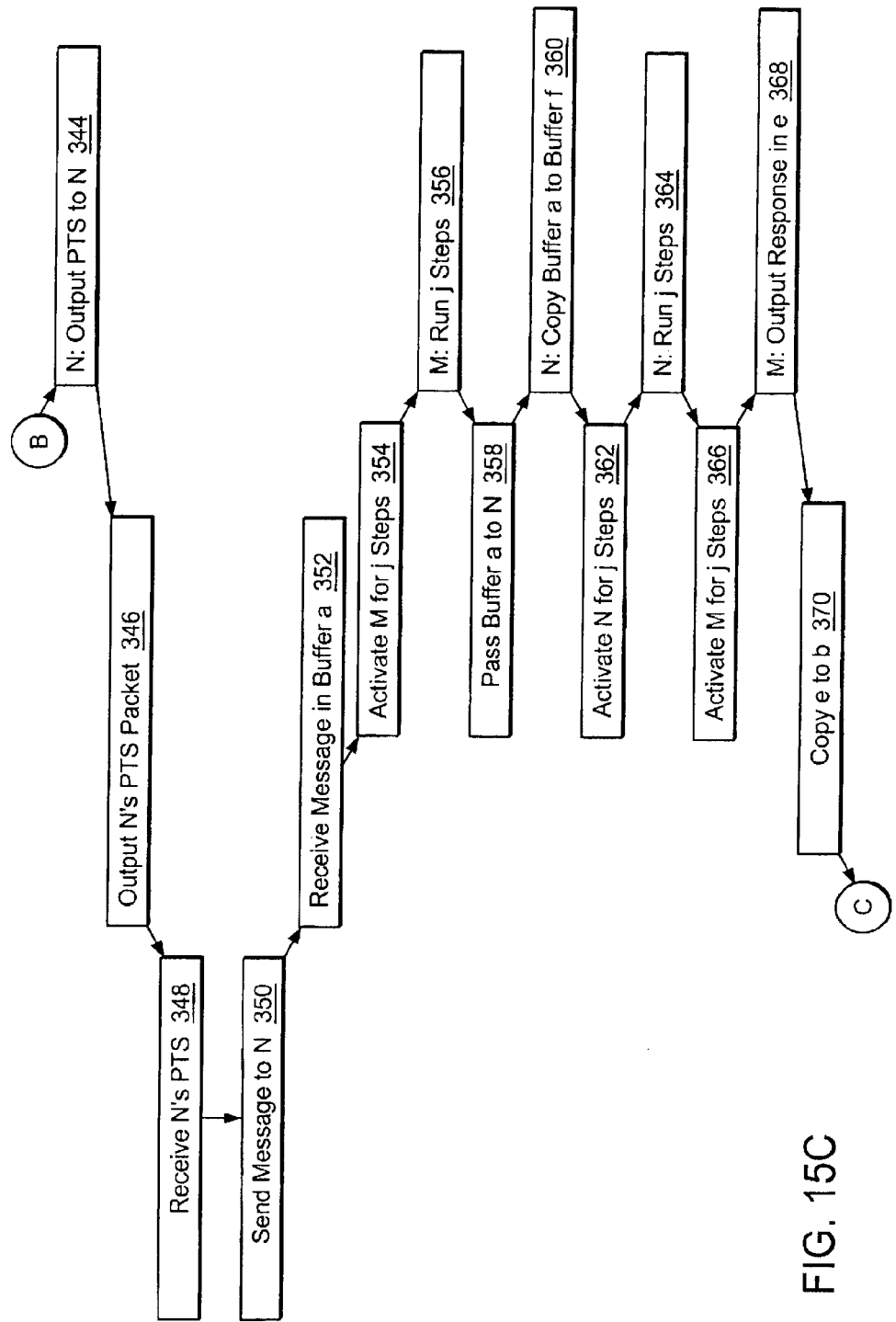
Figure 15D:
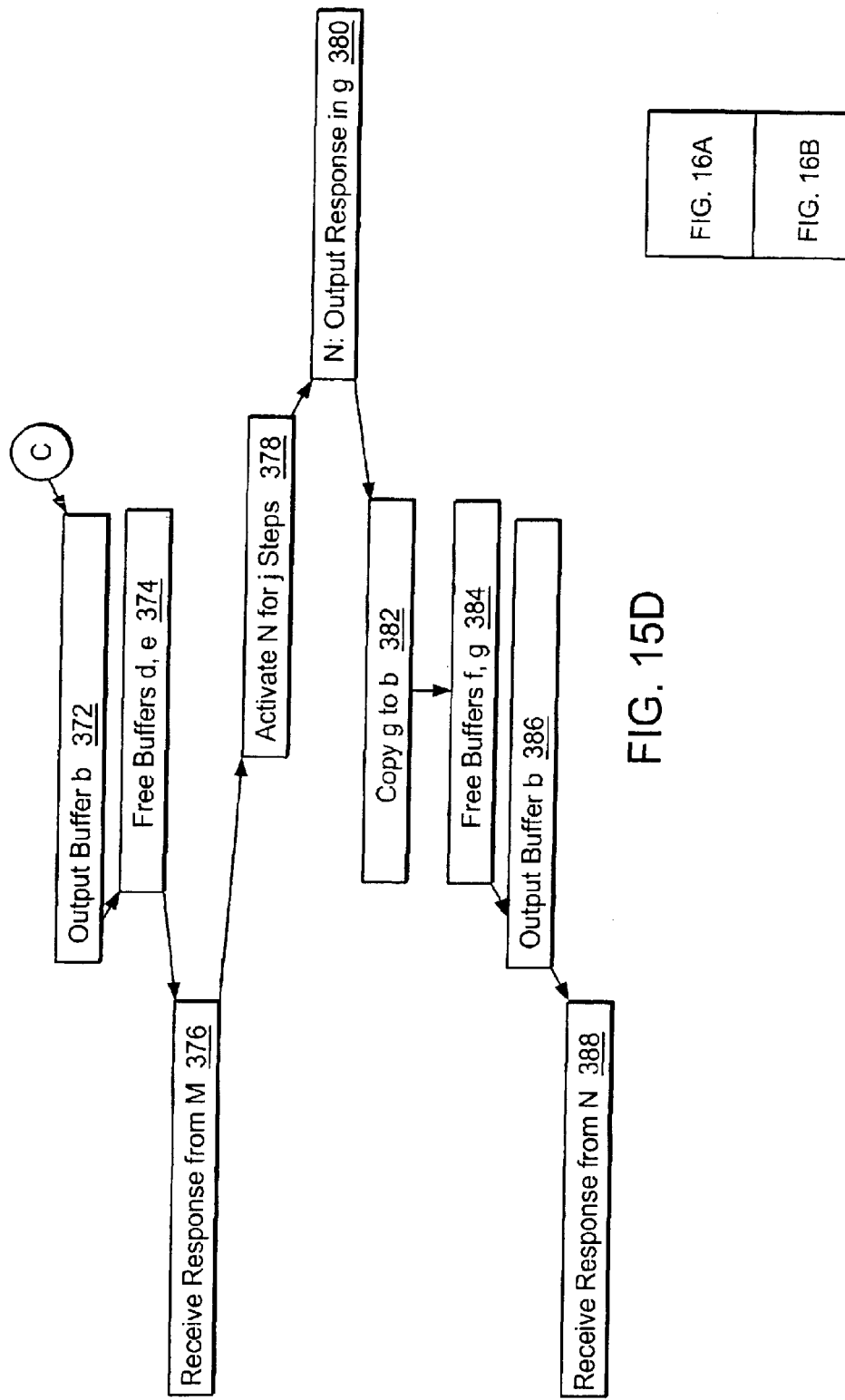

FIG. 15 is a schematic diagram of a timeline 300, with time going down, illustrating the operation (steps 302–388) of an embodiment of the present invention for an exemplary case of simultaneous communication between a host and two applications, Application M and Application N, on the smart card.

Figure 16:
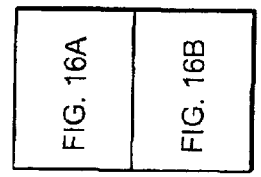
FIG. 16 is a schematic diagram of a timeline illustrating the operation of an embodiment of the present invention for an exemplary case of communication between a host and a single application which provides a multi-packet chained response.
Figure 16A:
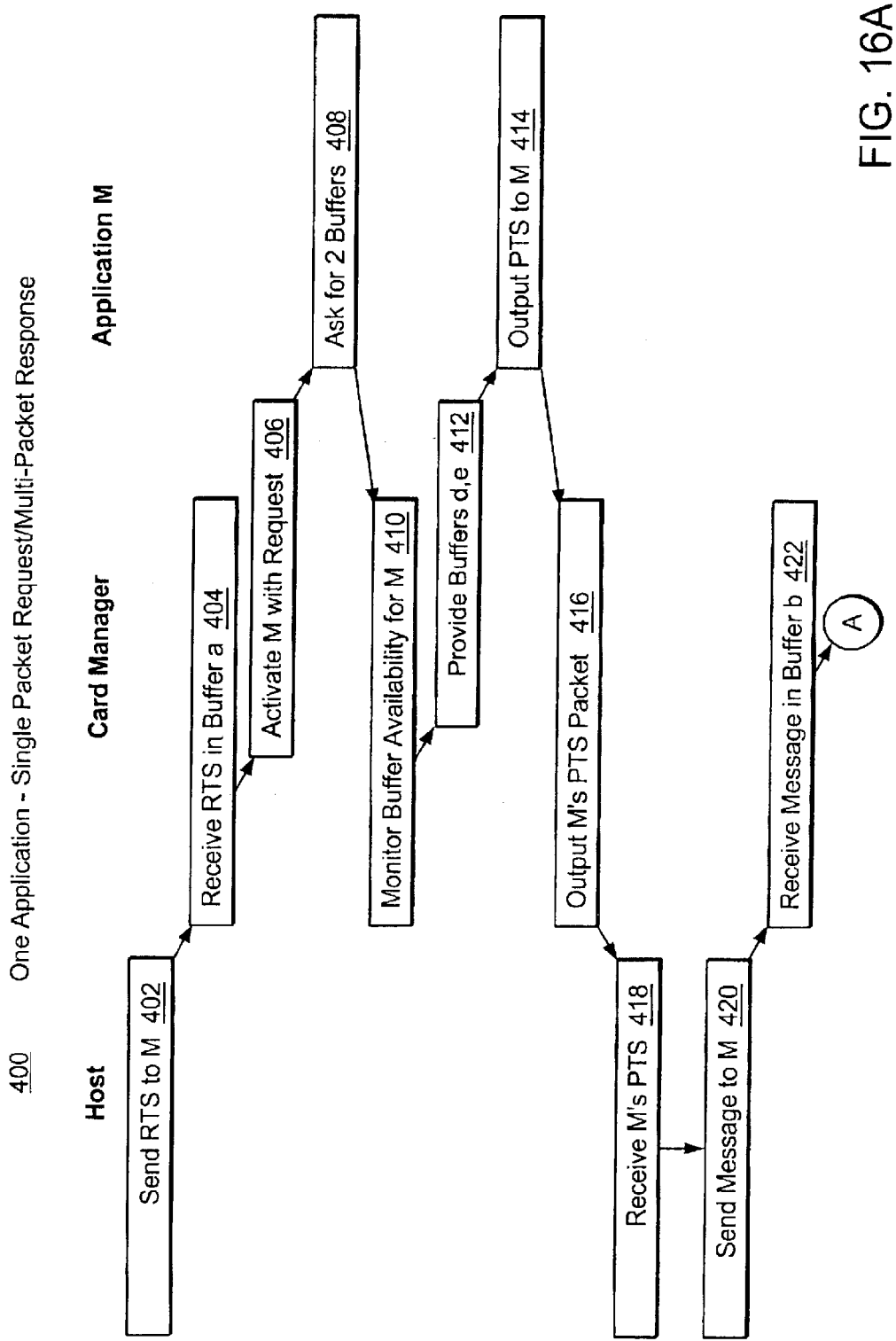
Figure 16B:
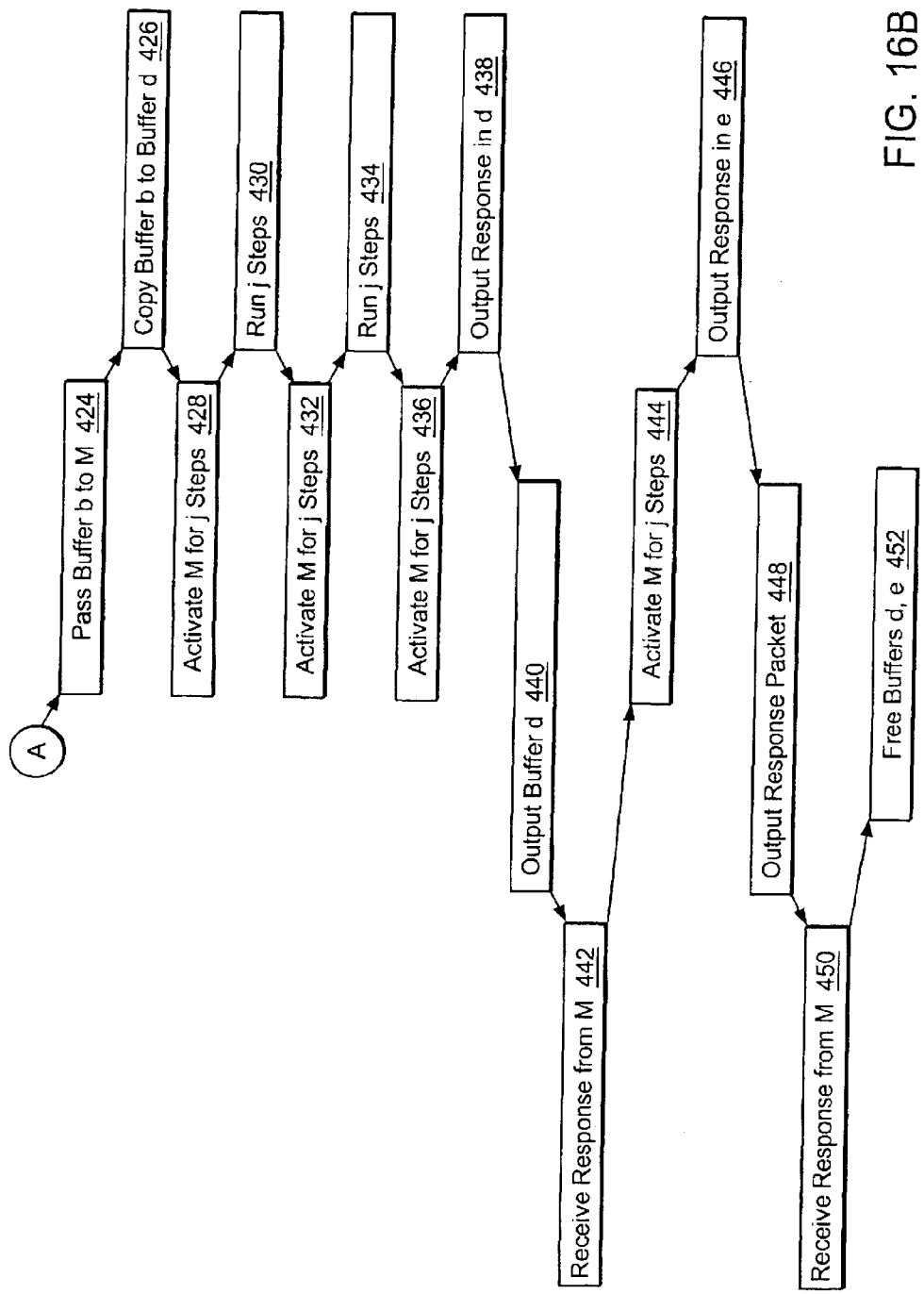

FIG. 16 is a schematic diagram of a timeline 400, with time going down, illustrating the operation (steps 402–452) of an embodiment of the present invention for an exemplary case of communication between a host and a single application that provides a multi-packet chained response.

In one embodiment, the original request to send packet contains an indication of the size of the message, e.g., the total number of bytes that the host seeks to send to an application. Because packets are a fixed size, the application can determine how many packets to expect and therefore how many permissions to send it must grant to the host to receive the entire message.

A permission is needed from the application for each and every packet of a multi-packet request, because the application may be able to process the packets as they arrive. Thus, an application may require only one buffer or it may need to have a number of blocks sufficient to handle the entire request allocated at one time to process the request. Neither the sender for the operating system can know which of these two cases apply in any particular situation. Therefore, it is up to the smart-card application to strobe the packets onto the card one at a time.

Each message has a unique identifier. A permission can then, for example, grant permission to the host to send part x of message y to application M, or alternatively grant permission to the host to send the next part of message y to application M.

Figure 17A:
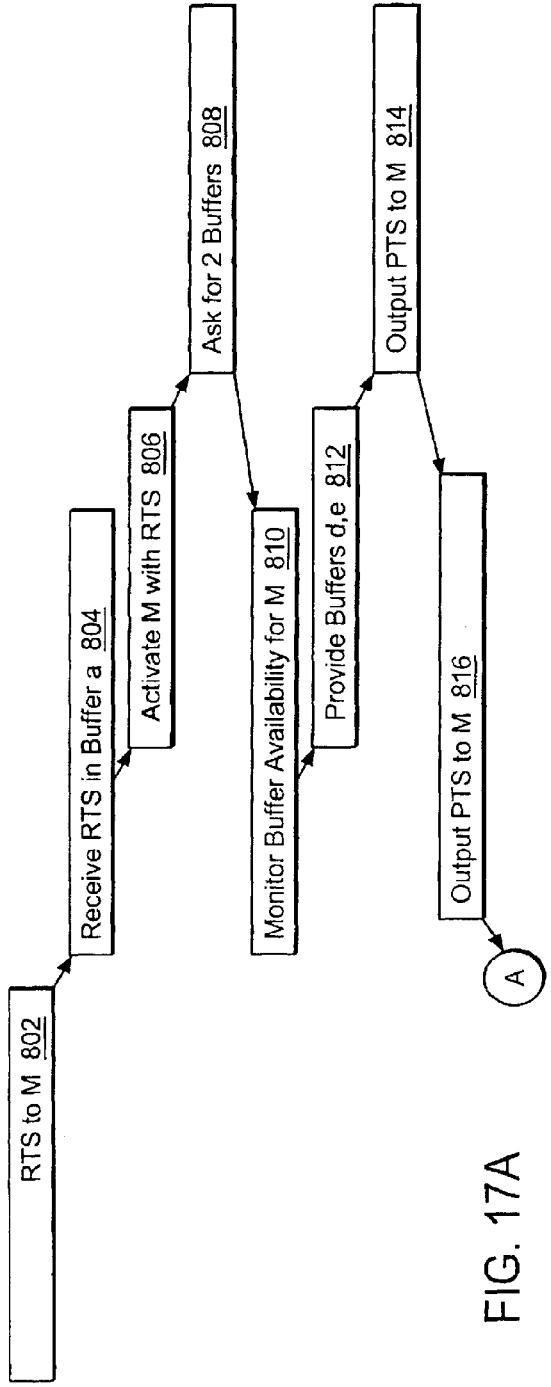
FIG. 17 is a schematic diagram of a timeline illustrating the operation of an embodiment of the present invention for an exemplary case of communication with a single application using a multi-packet input and multi-packet output where the entire message is received before processing by the smart card.
Figure 17B:
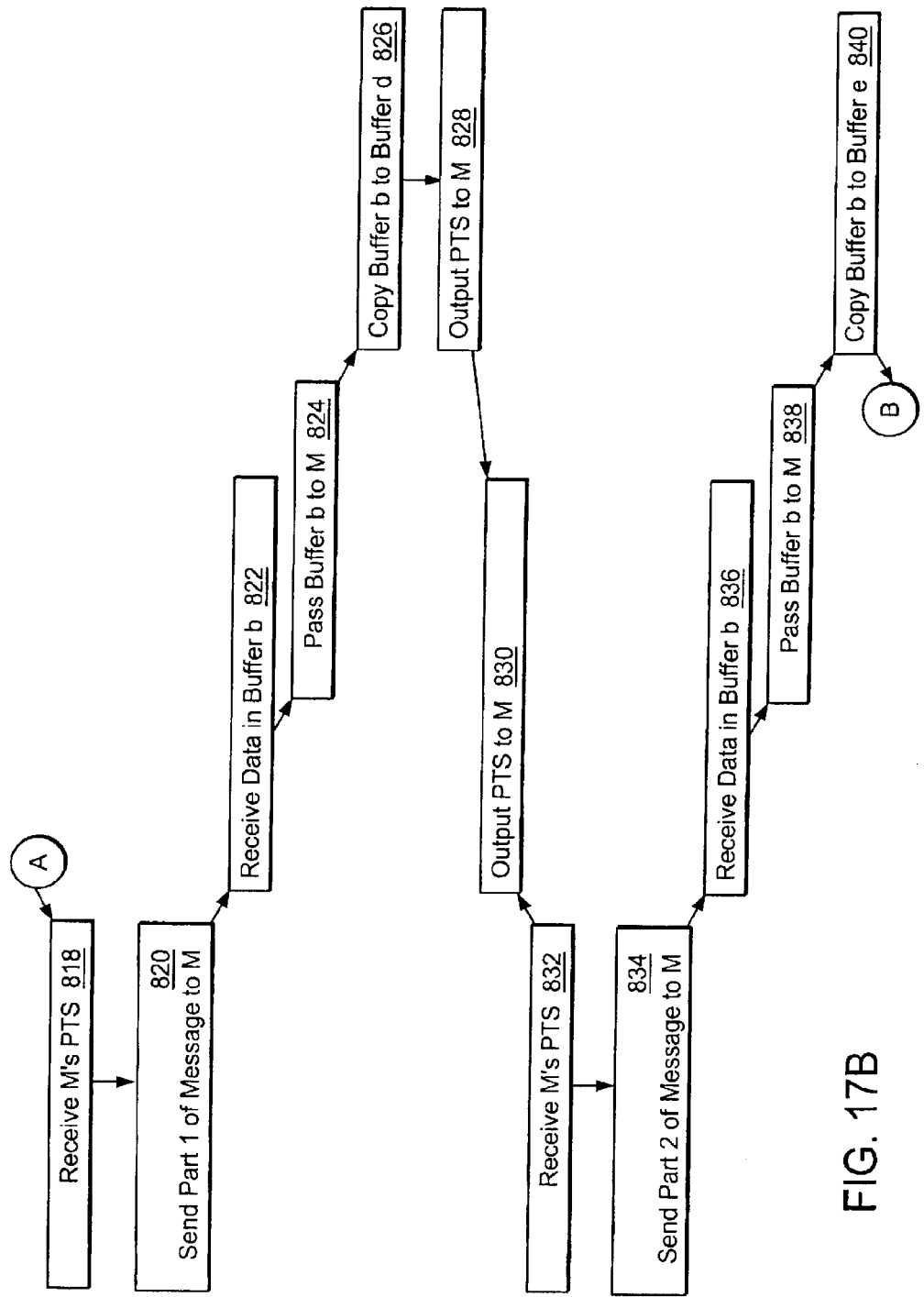
Figure 17C:
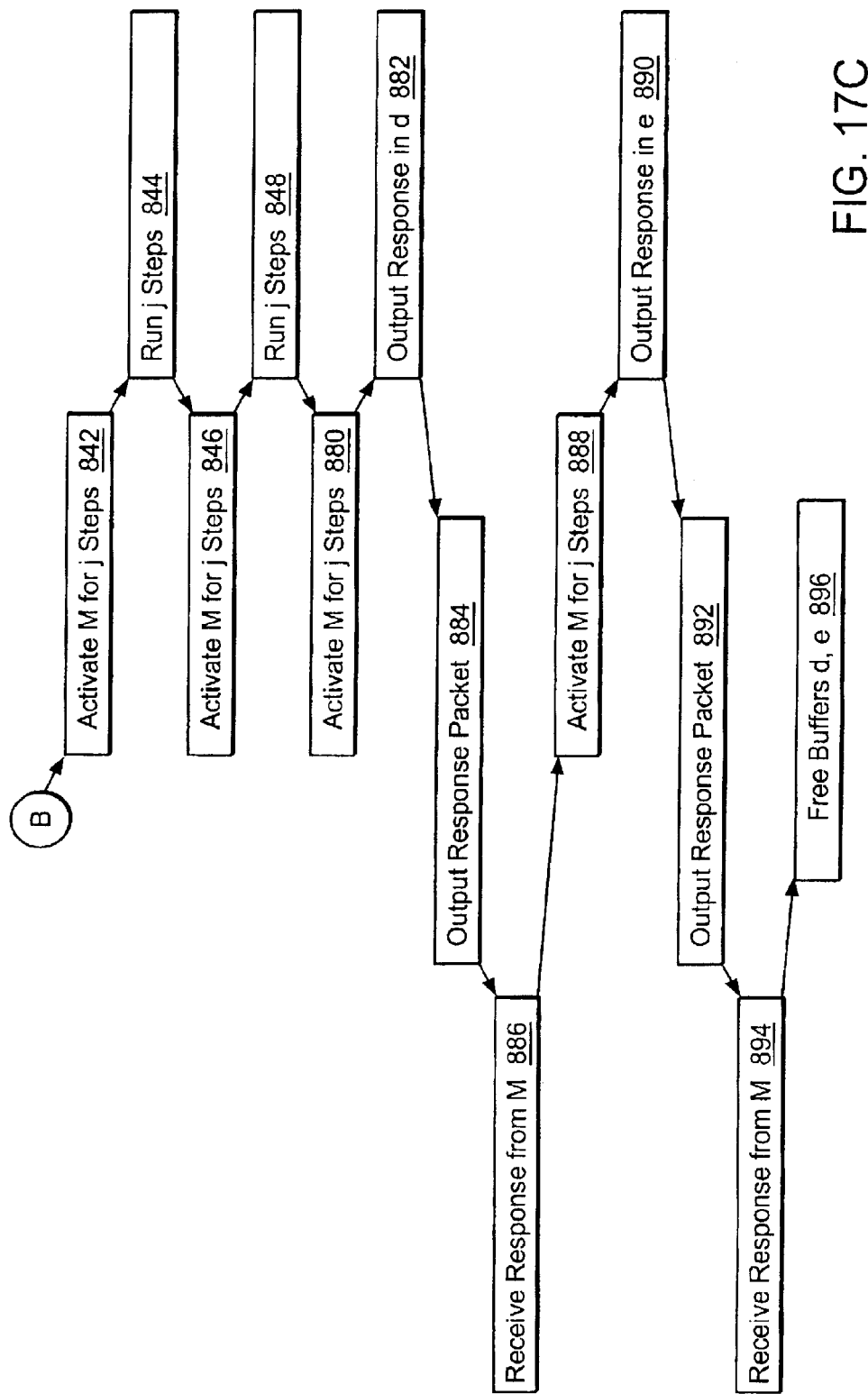

FIG. 17 is a schematic diagram of a timeline 800, with time going down, illustrating the operation (steps 802–866) of an embodiment of the present invention for an exemplary case of communication with a single application using a multi-packet input and multi-packet output where the entire message, comprising two packets is received before processing by the smart card. Thus, in this example, the application assembles the whole message before performing any processing. This is useful, for example, where the message is encrypted and the encryption depends on the whole message.

In the example of FIG. 17, a first request to send (RTS) is sent to the host at step 802. When a permission to send (PTS) is received (step 818), the host sends the first packet of the message (step 820). After receiving the first packet (step 826), the application sends out a second PTS (step 828). Upon receipt of the second PTS (step 832), the host sends the second packet to the application (step 834).

When the application receives the second packet of the message (step 840), it then processes the message (steps 844, 848) and finally outputs its multi-packet response at steps 882 and 890.

Figure 18:
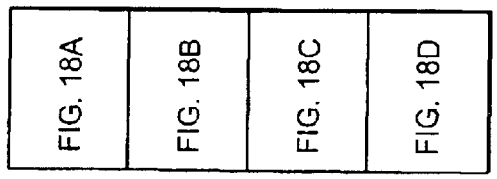
FIG. 18 is a schematic diagram of a timeline illustrating the operation of an embodiment of the present invention for an exemplary case of communication with a single application using a multi-packet input and multi-packet response, where message parts are processed by the smart card as they are received.
Figure 18A:
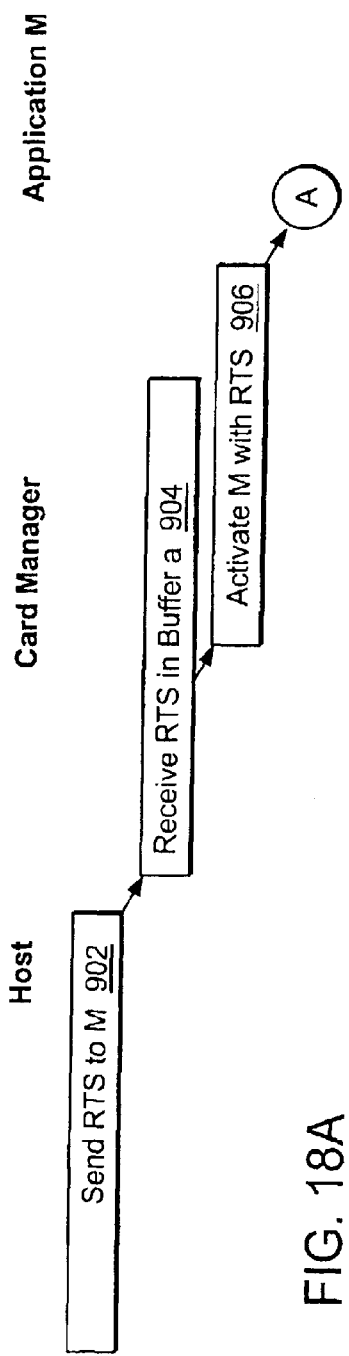
Figure 18B:
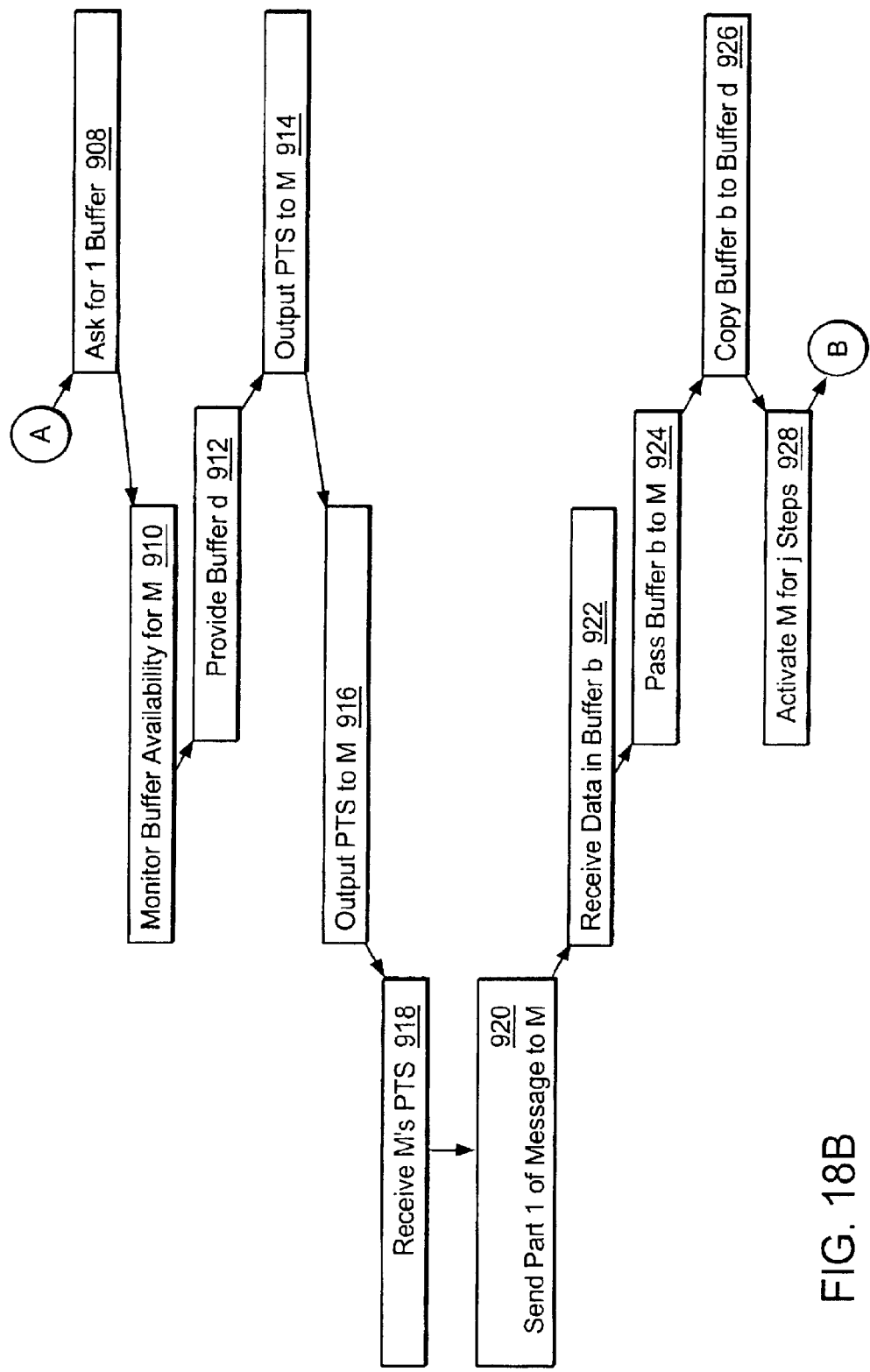
Figure 18C:
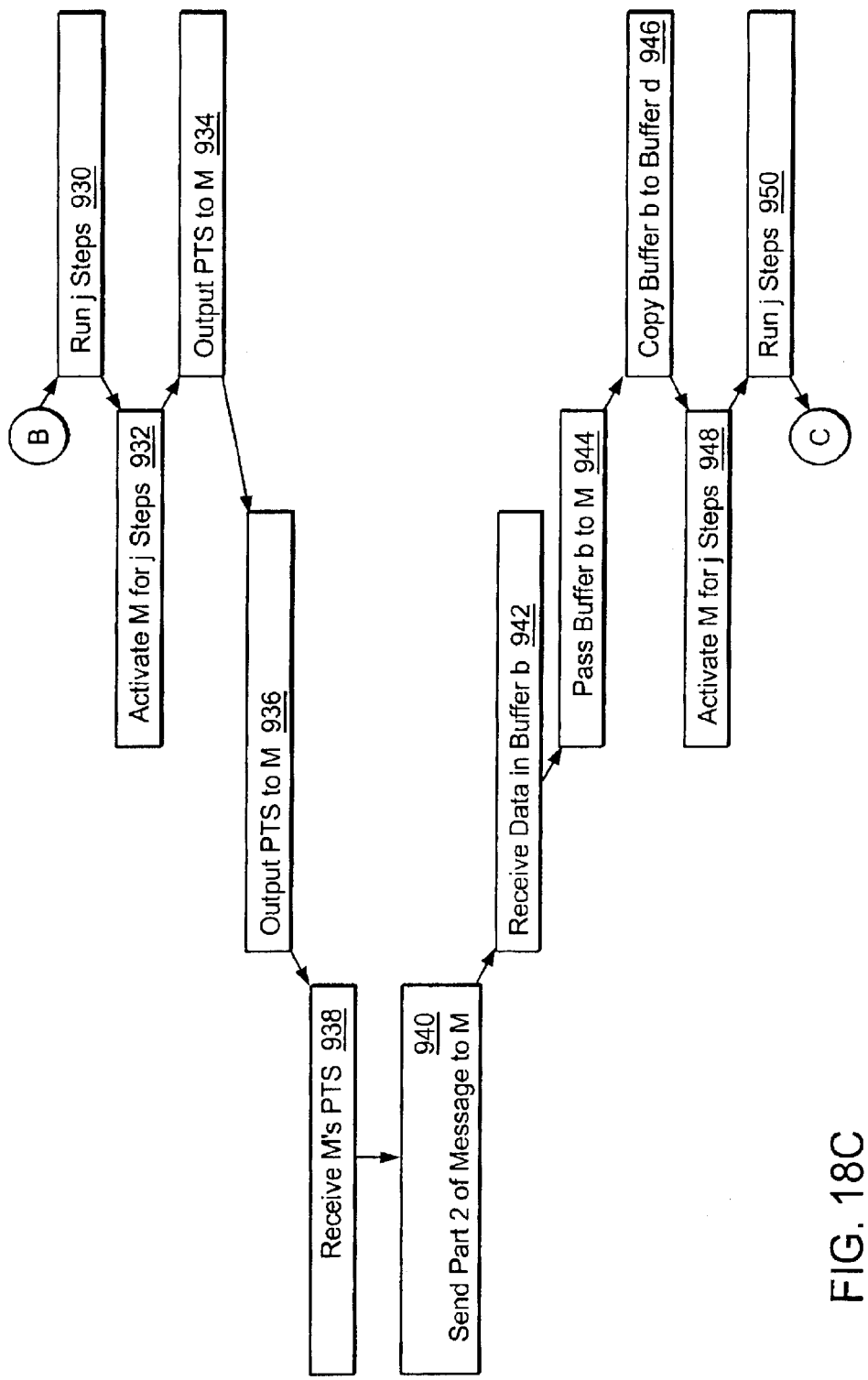
Figure 18D:
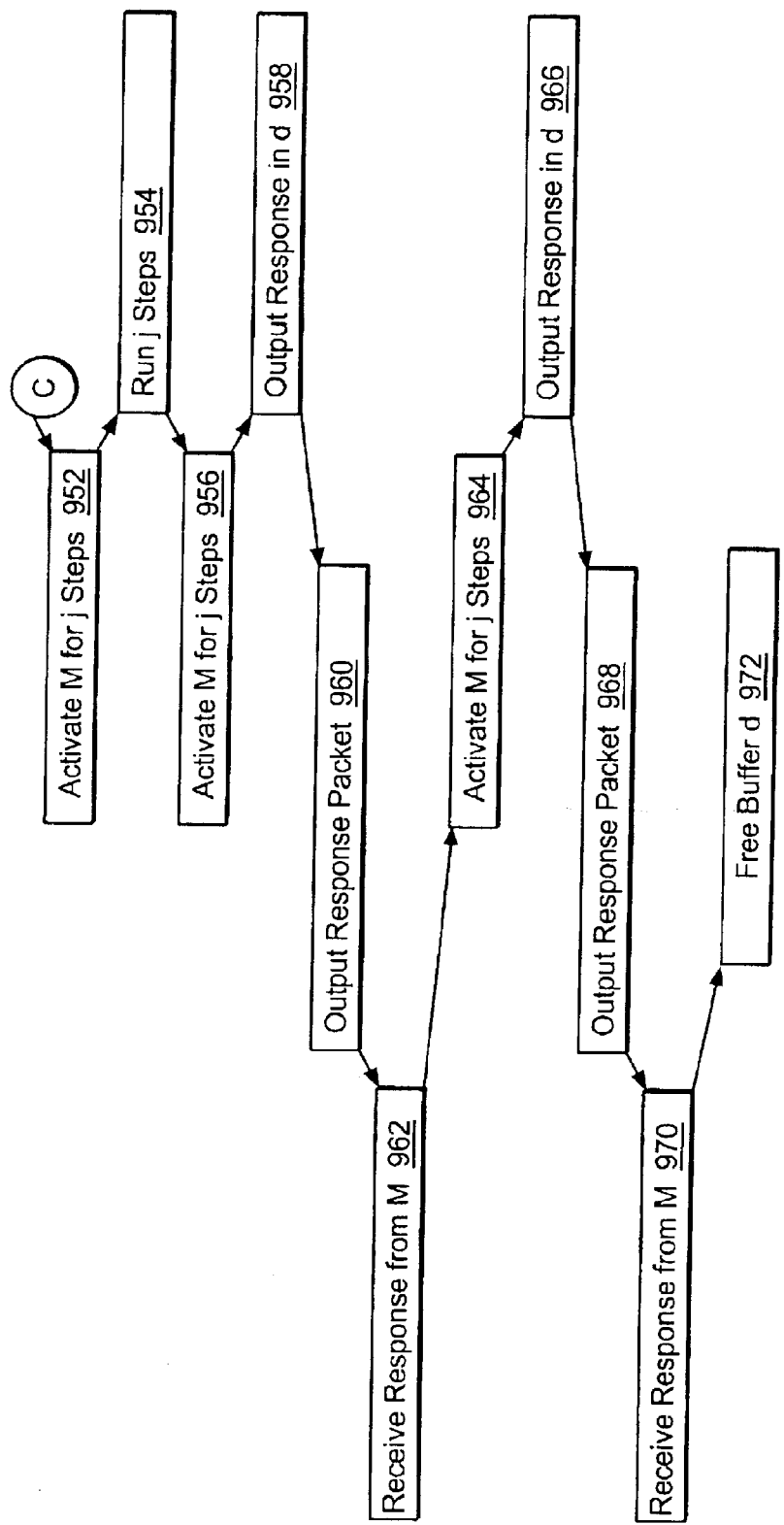

FIG. 18 is a schematic diagram of a timeline 900, with time going down, illustrating the operation (steps 902–972) of an embodiment of the present invention for an exemplary case of communication with a single application using a multi-packet input and multi-packet response, where message parts are processed by the smart card as they are received. Thus, in this example, the application needs only one buffer because the buffer can be reused to hold each new packet. This is useful, for example, where the application is handed several numbers to be stored.

In this case, a first request to send (RTS) is sent from the host at step 902. The application immediately asks for enough buffers to process a first packet (step 908), and when the requested number of buffers is provided (step 912), the application sends a permission to send (PTS) to the host (step 914).

Upon receipt of the PTS (step 918), the host sends the first packet of the message to the application (step 920). When the application receives the first packet (step 926), it processes the packet immediately (step 930) and then requests the next packet by sending another PTS to the host (step 934).

When the host receives this second PTS (step 938), it sends the second packet of the message (step 940). When the application receives the second packet (step 946), it processes the message (steps 950, 954). Upon completion of the processing, two packets are output to the host (steps 958, 966).

Virtual Memory Protocol

For an increasing number of smart card applications, it is desirable to present the card with blocks of data to be processed and to retrieve results from the smart card whose size exceeds the capacity of the RAM memory of the smart card. An example of such an application is implementing the Version 6 IP protocol (IPv6) on the smart card. The minimum block size of this protocol called the minimum transmission unit (mtu) is 1024 bytes. Another example is digital rights management wherein the cryptographic capabilities of the card are to be applied to blocks of multi-media data that exceed the available RAM in the smart card.

While each application could be written to manage its own use of RAM, this would be an inefficient use of both the computational capabilities of the smart card and the persistent memory (EEPROM) of the smart card. First, use of the computational capabilities would be inefficient because RAM management would be performed by the application, thus executing in the smart card's virtual machine which runs much slower than the hardware processor of the smart card. EEPROM use would be inefficient because each application stored in the EEPROM would contain code for RAM management. Since the problem is common across many applications on the smart card, a common and generally useable solution is desirable.

In the case where many applications on the smart card are sharing RAM, such that the use of any one application does not exceed the size of the RAM but the use of all the applications combined does, then the approach of having each application manage its own RAM usage does not work. This is because, for both practical and security reasons, one application cannot monitor the RAM usage of the other applications and thereby synchronize its usage to the usage of the other applications. In this case, a centralized solution is mandatory.

In an embodiment of the present invention, the portion of RAM in the smart card allocated for use by an application is divided into blocks called pages. The pages can be of equal size, although this is not necessary. The total number of pages on the smart card is denoted by M and they are indexed by I=1, 2, . . . , M, where I is the primary storage index.

The terminal into which the smart card has been inserted is assumed to be able to store the content of many more pages than the smart card. An example of such a terminal is a GSM or 3GPP mobile telephone where the smart card is a subscriber identity module (SIM) card. The number of pages that can be stored on the terminal is denoted as N and they can be indexed by J=1, 2, . . . , N, where J is the secondary storage index.

Pages are stored outside of the smart card in secondary storage. The terminal may provide the secondary storage itself or it may store pages on yet another device to which it connected via, for example, a communication channel. In either case, we say that the terminal stores the pages, as this is the smart card's view of the secondary storage.

Swapping

The process of moving a page between the smart card and the terminal is called swapping, and is performed by a swapper 35 (FIG. 2). In one embodiment of the present invention, the FETCH and TERMINAL RESPONSE APDUs defined in the current art are used for this purpose.

The smart card's reply to a FETCH APDU to the terminal contains a page of smart card RAM that is moving from the smart card to the terminal. The TERMINAL RESPONSE APDU issued by the terminal as a consequence of the FETCH APDU contains a page moving from the terminal to the smart card.

Figure 19:
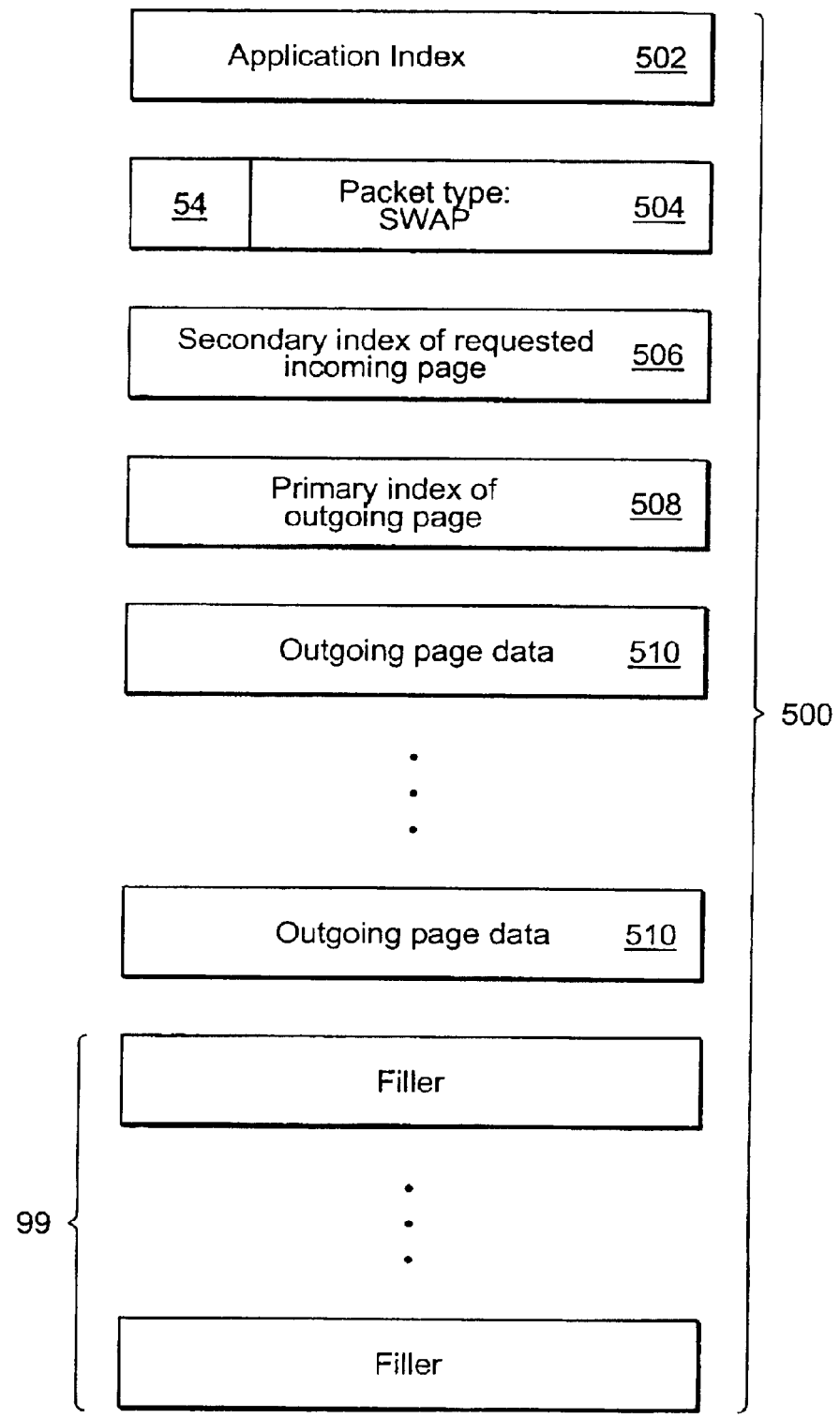
FIG. 19 is a schematic diagram illustrating a SWAP packet of one embodiment of the present invention.

FIG. 19 is a schematic diagram illustrating a SWAP packet 500 of one embodiment of the present invention. The smart card sends a SWAP packet in response to a FETCH command from the host. The application index 502 is that of the application for which data is being retrieved. The SWAP packet 500 includes a SWAP packet code 504, followed by the secondary index of the requested page 506, the primary index of the outgoing page as was returned previously by the host, and the outgoing page data, which may contain a length field. Of course, if all pages are a standard length, a length field is not necessary. It would be understood by one skilled in the art that the particular order of the fields in the SWAP packet 500 is not crucial to the implementation of the invention.

Figure 20:
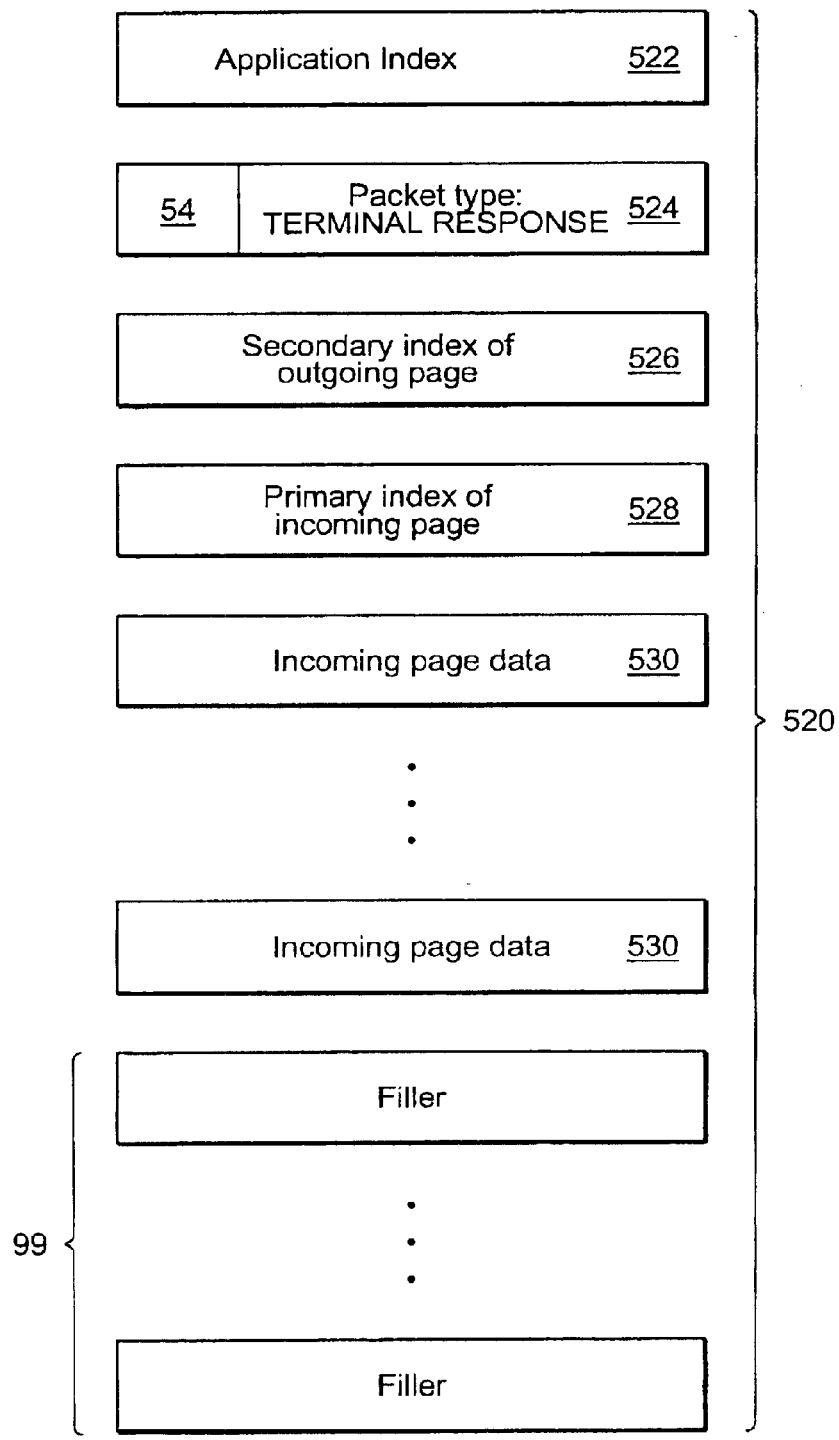
FIG. 20 is a schematic diagram illustrating a TERMINAL RESPONSE packet of one embodiment of the present invention.

FIG. 20 is a schematic diagram illustrating a TERMINAL RESPONSE packet 520 of one embodiment of the present invention. A TERMINAL RESPONSE packet is sent from the host to the smart card in response to a SWAP packet 500.

The TERMINAL RESPONSE packet 520 includes the application index 522 used in the corresponding SWAP packet 500, and a TERMINAL RESPONSE packet code 524, followed by the secondary index 526 of the outgoing page which was last sent in a SWAP packet. Next is the primary index 528 of the requested incoming page, followed by the incoming page data 530. As with the SWAP packet, a TERMINAL RESPONSE packet 520 can contain a length field, and the particular order of the fields in is not crucial to the implementation of the invention.

Swap Table

FIG. 21 is a schematic diagram of an exemplary swap table 600 maintained by the smart card operating system, in an embodiment of the present invention, to track application pages. There is one entry in the table 600 for each RAM block required for each executing application.

The swap table 600 has three columns. The first column 602 holds the secondary index, i.e., a pointer to the data that has been stored in the external or secondary storage. A secondary index of 0 means that the application page is currently in the smart card. A secondary index greater than 0 means that the page is currently stored on the terminal at the indicated secondary index position.

The second column 604 identifies the application to which the data belongs. In one embodiment, this is the application index, although it could be another identifier, such as the application's unique registered identifier or the application's name.

The third column 606 holds the primary index. This is a reference to the memory block 40 where the application identified in column 604 can find the data.

Note, in the example of FIG. 21, memory block 4 has been assigned to two different applications, identified with Application ID (AID) 8 and AID 5. Since memory block 4 can only hold one set of data at a time, the data for Application AID 8 has been swapped out to secondary storage, to the location identified by the secondary index which has a value of 145. Data for Applications AID 2 (#2) and AID 5 (#5) reside in the smart card in memory blocks 7 and 4 respectively, as indicated by the corresponding secondary indices 602 being zero.

Swapping Algorithm

Given the swap table 600 of FIG. 21, suppose that the Application 8 is to be placed into execution. The smart card operating system consults the swap table 600 and observes that this application needs the smart card RAM page with primary index 4, but that this page is currently being used by another application, namely Application #5. At the next opportunity, the smart card requests the sending of a FETCH APDU from the terminal or host, and returns a SWAP reply to this FETCH APDU.

For example, when a SIM responds to its host, it normally responds with the two bytes "90 00" to indicate successful execution of the host's command. However, the SIM can also respond with "91 xx" to indicate that the host's command has executed successfully, and that the SIM has xx bytes to send to the host. The host normally responds with a FETCH APDU to retrieve the xx bytes. This is the method defined by the ETSI standard GSM 11.14. In the present invention, the SIM returns a SWAP packet.

Figure 22:
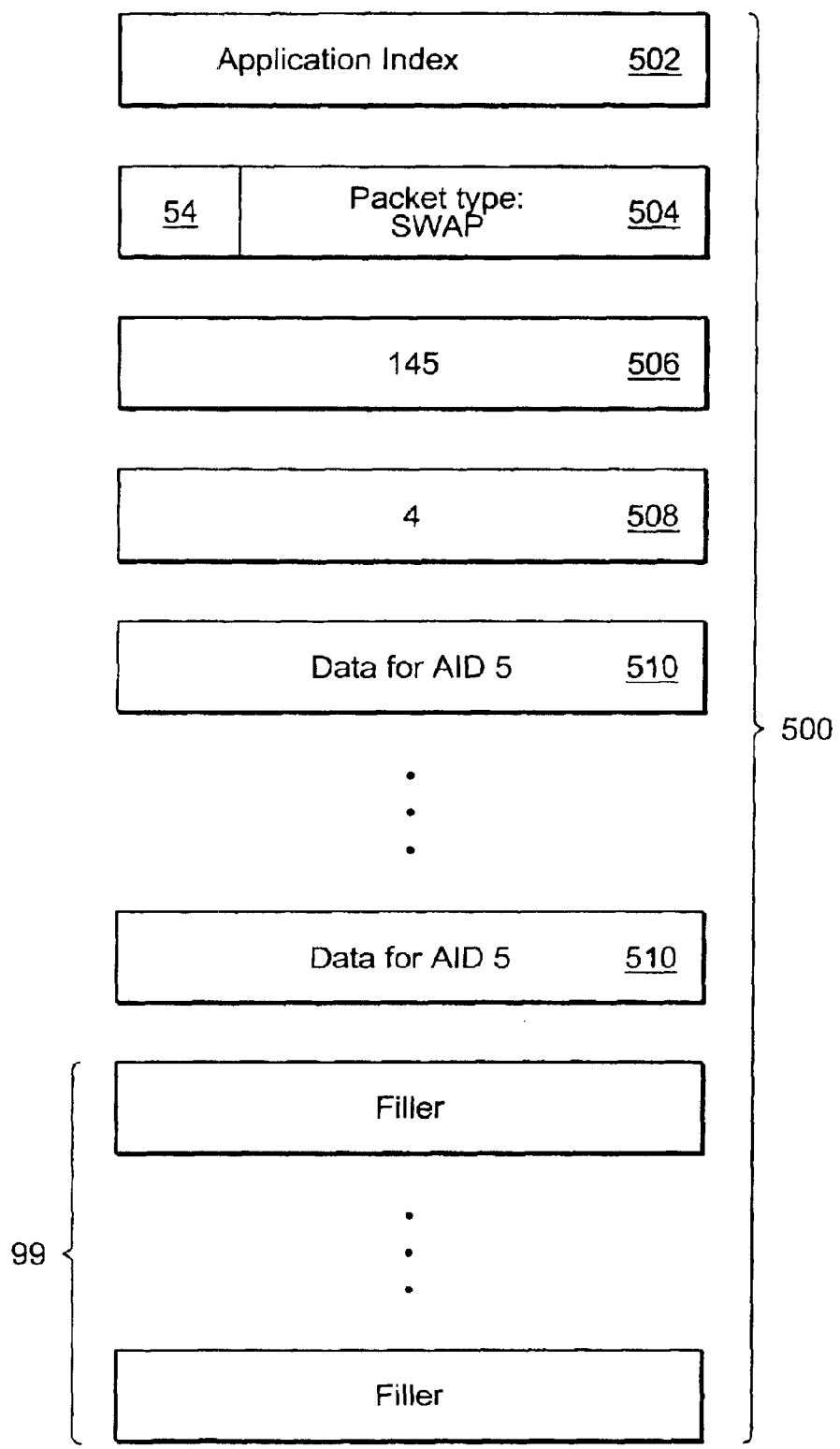
FIG. 22 is a schematic diagram of the SWAP packet that the smart card returns for the example of FIG. 20.

FIG. 22, using the same reference numbers as FIG. 19, is a schematic diagram of the SWAP packet 500 that the smart card returns for the example of FIG. 21. The secondary index 506 of the requested incoming page is 145. The primary index 508 of the outgoing page is 4, and the outgoing data 510 is the data currently residing in page 4, which is being used by Application #5.

Figure 23:
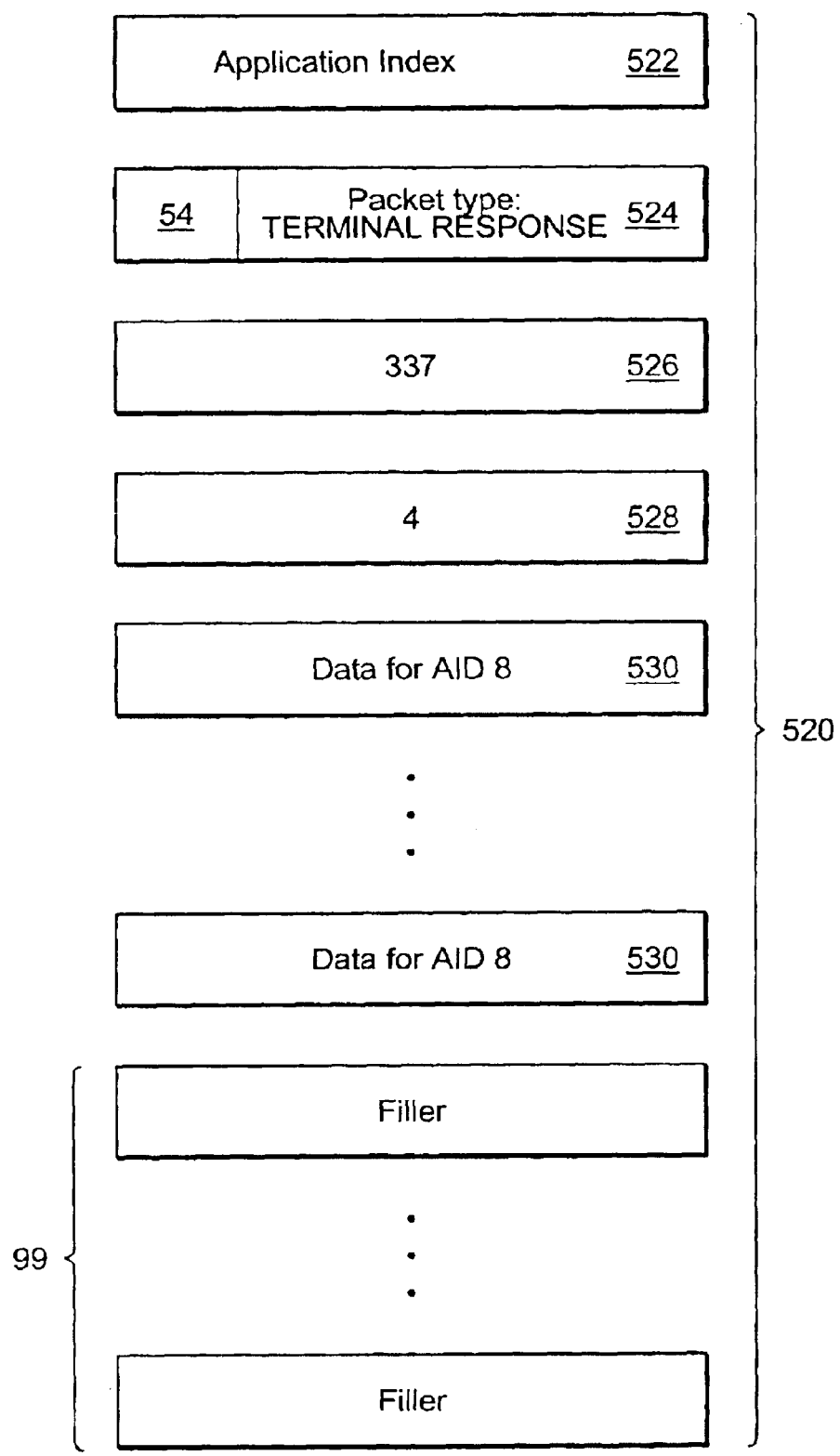
FIG. 23 is a schematic diagram of the subsequent TERMINAL RESPONSE APDU sent by the terminal or host in response to the SWAP packet of FIG. 21.

FIG. 23 is a schematic diagram of the subsequent TERMINAL RESPONSE APDU 520 sent by the terminal or host in response to the SWAP packet of FIG. 22. The secondary index 526 assigned to the outgoing data 510 (FIG. 22) is 337. Finally, the incoming data 530 is the data for Application #8, and will be placed into memory page 4.

Before copying the content data in the TERMINAL RESPONSE to smart card page 4 and activating Application #8, the smart card operating system then updates the swap table. FIG. 24 is a schematic diagram of the swap table of FIG. 21 that has been updated after receiving the data in the TERMINAL RESPONSE APDU of FIG. 23.

Extended Swap Table

FIG. 25 is a schematic diagram illustrating an embodiment an extended swap table 700. The extended swap table 700 supports an additional level of indirection between the application and the smart card RAM. In this embodiment, the smart card operating system can place an application page having, say, primary index K at location L in the smart card RAM.

Here, columns 702, 704 and 706 correspond respectively to columns 602, 604 and 606 of FIG. 21, with the exception that in the swap table 600 (FIG. 21), the primary index 606 points directly to a memory page 40, while in the extended swap table 700 of FIG. 25, the primary index 706 serves to identify the data via a virtual page number, while column 708 provides a pointer to the physical RAM location.

With an extended swap table 700, an application must inquire about the current location of its block K before using it rather than simply assuming that its block K is in RAM location K. For example, Application #8's page 4 is actually located in physical page 6.

While this entails some extra processing, it allows the smart card operating system to use swapping algorithms that yield more efficient use of smart card RAM and at the same time require less overall swapping. An example of such an algorithm is the least recently used (LRU) algorithm. In the LRU algorithm, when a free slot is needed to swap in a needed page, rather than swapping out the location where the page is to be addressed by the application, the page that was used by an application the farthest back in time, i.e., least recently, is freed up by swapping it out.

It will be apparent to those of ordinary skill in the art that methods involved in the present system for concurrent communication with multiple smart-card applications and a virtual memory protocol may be embodied in a computer program product that includes a computer usable medium. For example, such a computer usable medium can include a readable memory device, such as a hard drive device, a CD-ROM, a DVD-ROM, or a computer diskette, having computer readable program code segments stored thereon. The computer readable medium can also include a communications or transmission medium, such as a bus or a communications link, either optical, wired, or wireless, having program code segments carried thereon as digital or analog data signals.

While this invention has been particularly shown and described with references to preferred embodiments thereof, it will be understood by those skilled in the art that various changes in form and details may be made therein without departing from the scope of the invention encompassed by the appended claims.

What is claimed is:

1. A smart card operable to hold a plurality of applications, the smart card comprising:
   a memory, logically partitioned into a plurality of memory blocks;
   a control program comprising:
   allocation program code for dynamically allocating at least one memory block for at least one of the plurality of applications, in response to a declaration for the at least one application of the at least one application's memory needs, and
   scheduler program code, responsive to the allocation program code and memory allocation, for scheduling applications for executions, wherein the at least one application is scheduled for execution only if the at least one application's declared memory needs have been satisfied, the scheduler program code comprising code for scheduling execution of the at least one application to a predetermined granularity; and
   a virtual machine in communication with the logically partitioned memory, for executing the at least one application.

2. The smart card of claim 1, the control program code for scheduling comprising:
   program code for communicating with the virtual machine to control scheduling.

3. The smart card of claim 1, the control program code for scheduling comprising:
   program code for counting the number of byte code instructions executed for the at least one application; and
   program code for interrupting execution of the at least one application after a predetermined number of byte code instructions have been counted.

4. The smart card of claim 1, the control program for scheduling comprising:
   program code for scheduling execution of one or more byte code instructions of the at least one application based on time to execute the one or more byte code instructions; and
   program code for interrupting execution of the at least one application after the completion of the execution of the one or more byte code instructions.

5. A method for scheduling multiple applications on a smart card, the method comprising:
   logically partitioning memory on the smart card into a plurality of memory blocks;
   allocating at least one memory block for at least one of the applications, in response to a declaration from the at least one application of its memory needs;
   in response to allocating, scheduling the at least one application for execution only if the at least one application's declared memory needs have been satisfied thereby;
   executing, in a virtual machine, the at least one application; and communicating with the virtual machine to control scheduling to a predetermined granularity.

6. A smart card, comprising:
   storage for a plurality of applications, each application comprising a plurality of byte code instructions;
   a virtual machine, in communication with the storage, for executing one or more of the plurality of applications; and
   a control program comprising
   scheduler program code, in communication with the virtual machine, for scheduling one or more of the applications for execution in accordance with a scheduling regime, the scheduler program code comprising
   granularity control program code for communicating with the virtual machine to control execution of one of the applications, in accordance with the scheduling regime, to a predetermined granularity;
   wherein the predetermined granularity comprises: program cede for controlling execution of the one scheduled application via the virtual machine based upon time to execute one or more byte code instructions of the one scheduled application; program code for temporarily discontinuing the execution of the scheduled application after completion of the time to execute the one or more byte code instructions of the one scheduled application; and program code for executing another scheduled application.

7. A smart card, comprising:
   storage for a plurality of applications, each application comprising a plurality of byte code instructions;
   a virtual machine, in communication with the storage, for executing one or more of the plurality of applications; and
   a control program comprising
   scheduler program code, in communication with the virtual machine, for scheduling one or more of the applications for execution in accordance with a scheduling regime, the scheduler program code comprising
   granularity control program code for communicating with the virtual machine to control execution of one of the applications, in accordance with the scheduling regime, to a predetermined granularity;
   wherein the predetermined granularity comprises: program code for controlling execution of the one scheduled application via the virtual machine by counting byte code instructions executed by the one scheduled application; program code for temporarily discontinuing execution of the one scheduled application after execution of a predetermined number of byte code instructions of the one scheduled application; and program code for executing another scheduled application.

* * * * *